US008385322B2

(12) United States Patent
Colling et al.

(10) Patent No.: US 8,385,322 B2
(45) Date of Patent: Feb. 26, 2013

(54) DISTRIBUTED AD HOC NETWORK PROTOCOL USING SYNCHRONOUS SHARED BEACON SIGNALING

(75) Inventors: Kent D. Colling, Forest, VA (US); Paul R. Carpenter, Lynchburg, VA (US); Luke Koleszar, Lynchburg, VA (US); Paul E. Schmidt, Forest, VA (US)

(73) Assignee: Innovative Wireless Technologies, Inc., Forest, VA (US)

( * ) Notice: Subject to any disclaimer, the term of this patent is extended or adjusted under 35 U.S.C. 154(b) by 496 days.

(21) Appl. No.: 12/670,280

(22) PCT Filed: Jul. 28, 2008

(86) PCT No.: PCT/US2008/071346
§ 371 (c)(1),
(2), (4) Date: Jan. 22, 2010

(87) PCT Pub. No.: WO2009/018212
PCT Pub. Date: Feb. 5, 2009

(65) Prior Publication Data
US 2010/0226342 A1 Sep. 9, 2010

Related U.S. Application Data

(60) Provisional application No. 60/952,643, filed on Jul. 30, 2007.

(51) Int. Cl.
*H04J 3/06* (2006.01)
(52) U.S. Cl. ........................................ 370/350; 370/503

(58) Field of Classification Search .......... 370/310–350, 370/503–520; 455/500–503, 507
See application file for complete search history.

(56) References Cited

U.S. PATENT DOCUMENTS

| | | | | |
|---|---|---|---|---|
| 6,028,853 | A * | 2/2000 | Haartsen ........................ | 370/338 |
| 7,701,882 | B2 * | 4/2010 | Jones et al. ................... | 370/260 |
| 8,086,172 | B2 * | 12/2011 | Bettis et al. .................. | 455/3.04 |
| 8,199,689 | B2 * | 6/2012 | Maltseff et al. .............. | 370/312 |
| 2002/0082035 | A1 * | 6/2002 | Aihara et al. ................. | 455/518 |
| 2005/0169292 | A1 * | 8/2005 | Young ........................... | 370/432 |
| 2006/0146821 | A1 * | 7/2006 | Singh et al. .................. | 370/390 |
| 2007/0042706 | A1 * | 2/2007 | Ledeczi et al. .............. | 455/3.01 |
| 2007/0047586 | A1 * | 3/2007 | Tieman et al. ............... | 370/486 |
| 2007/0177567 | A1 * | 8/2007 | Parys ............................ | 370/346 |
| 2007/0223497 | A1 * | 9/2007 | Elson et al. ................... | 370/400 |
| 2008/0268855 | A1 * | 10/2008 | Hanuni et al. ............... | 455/445 |
| 2010/0202436 | A1 * | 8/2010 | Albert et al. ................. | 370/350 |

* cited by examiner

*Primary Examiner* — Andrew Chriss
*Assistant Examiner* — Kenan Cehic
(74) *Attorney, Agent, or Firm* — Woods Rogers PLC; Peter E. Rosden

(57) ABSTRACT

A method for forming a protocol structure for use in an ad hoc, distributed, scaleable wireless sensor node network which enables nodes to join the network autonomously without there being a designated, permanent central time reference and for enabling such nodes to synchronize timing with each other and with other nodes in the network. The method involves discovering the active channel changing sequence used by the network, synchronizing communications of a new node with the remainder of the nodes in the network and scanning communications channels to detect merging clusters of nodes.

4 Claims, 25 Drawing Sheets

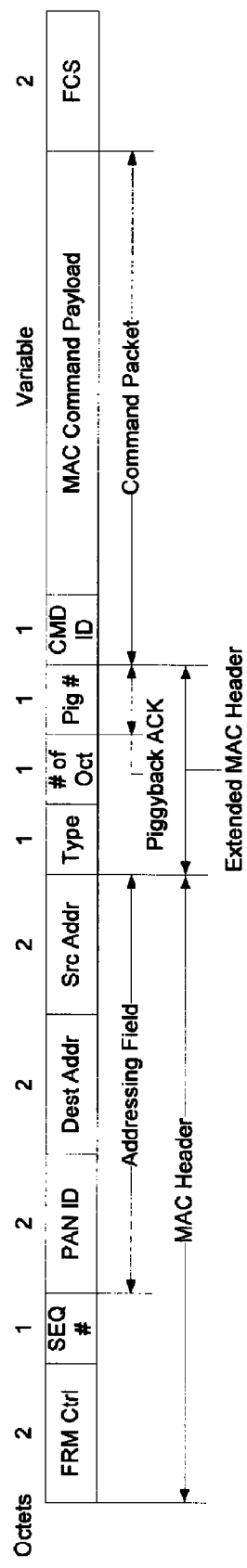
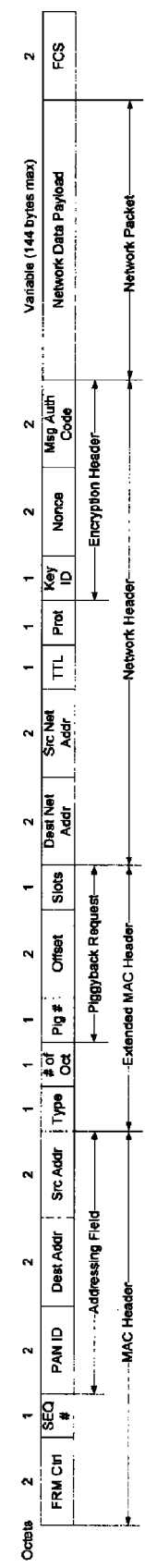
FIG 4A
FIG 4B

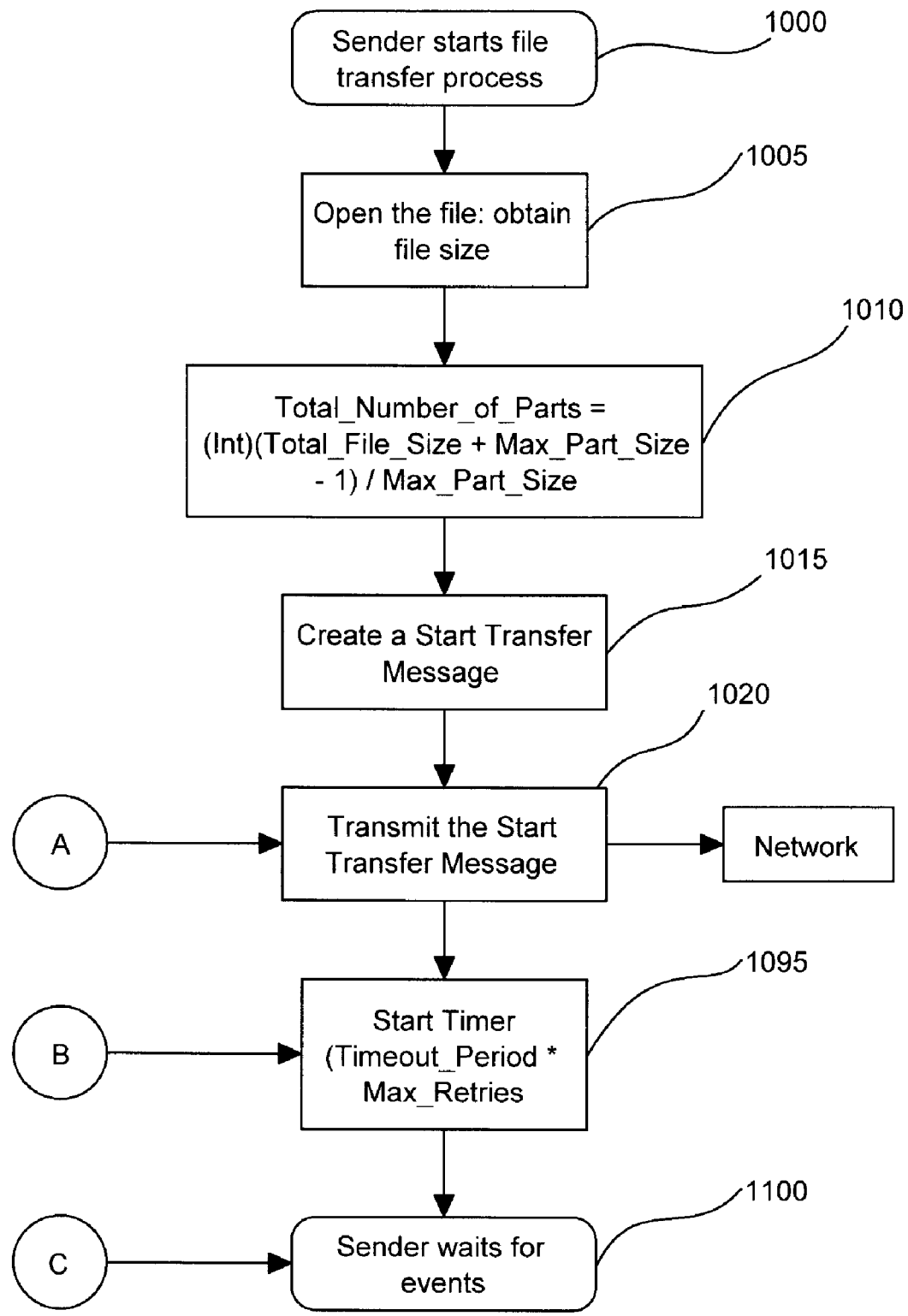

DISTRIBUTED AD HOC NETWORK PROTOCOL USING SYNCHRONOUS SHARED BEACON SIGNALING

CROSS REFERENCE

This application claims the benefit of U.S. Provisional patent application No. 60/952,643, filed Jul. 30, 2007, which is incorporated herein by reference in its entirety.

TECHNICAL FIELD

The present invention relates to a wireless network architecture and protocol for widely distributed sensor nodes that can be expanded globally for remote supervision, asset control and operational management.

BACKGROUND OF THE INVENTION

With the emergence of wireless networking technologies such as IEEE 802.11, Bluetooth, and IEEE 802.15.4 new and exciting applications have been enabled. Specifically, the ad hoc or mesh networking capabilities introduced by these technologies has application to wireless sensor networks, mobile data/voice communication networks, enhanced situational awareness, and asset tracking applications. While the standard protocols identified above work well for the applications they were designed for, many applications require operation in a truly autonomous environment and potentially in remote locations where no "mains" powered type devices are available. Thus autonomous operating modes require a truly peer-to-peer (P2P) network topology versus a hierarchical topology where one or more nodes serve as a "master" or "coordinator". The existing standards are not fully designed to operate in an autonomous mode. They are dependent on central, typically higher power consuming, network coordinating nodes. This leads to single points of failure, limits the scalability of the network of larger deployments, and in general requires knowledge of the network deployment topology. True P2P operation in an ad hoc manner is not enabled.

The following challenges face ad hoc network protocol:
1. True autonomous operation without the presence of coordinating nodes
2. Discovery and maintenance of network topology
3. Time synchronized operation
4. Energy efficient power saving modes
5. Simultaneous operation of many nodes in a shared radio frequency (RF) medium
6. Packet latency across multiple hops within the ad hoc network
7. Reliable transfer of data across a multi-hop network Discovery and maintenance of neighbor nodes during autonomous operation is the primary issue in true P2P networking. Nodes joining the network do not have a known master or do not know which if any neighbor nodes are present. New nodes must discover or establish the channel sequence or pattern in which to communicate with the rest of the network. The discovery and channel acquisition process can be time consuming particularly in low power duty cycled operation or in highly mobile environments where nodes are continually moving in and out of range of one another. The protocol must have mechanisms to rapidly acquire and track the network communication channel and must be flexible to adjust to disparate scenarios of operation.

Idle listening and uncoordinated transmissions in low power applications is a major source of energy waste. Synchronization of network protocols such that neighboring nodes are "awake" and communicating at the same time is an important goal of the design. This orchestrated operation is achieved via time synchronization of nodes. Efficient synchronization of the nodes without a common time reference in an autonomous network is the challenge.

Throughput and interference mitigation in a shared RF propagation environment is also a challenge. Since it is likely many neighbor nodes will hear other neighbor nodes, it is further likely that the packet collision rate on a shared channel will be high. The classic "hidden node" problem is the result. Collisions result in retries, thus additional collisions, and an overall "snowball" effect which reduces throughput of the network data. For increased network throughput it is desirable for nodes to establish different channels of communication, i.e. via direct sequence spread spectrum or frequency hopping spread spectrum, with peer nodes such that channel diversity is attained and simultaneous operation of neighbor pairs is achieved. An effective protocol must support this multi-channel operation and simultaneous operation of neighboring nodes.

Packet latency across the network is a common problem encountered in ad hoc networks, particularly low power applications. Under normal operating conditions it is desirable to keep the nodes in low power sleep states as much as possible to maximize battery life. When nodes wake-up and have data to pass, it is essential that neighbor nodes are awake and listening at the same time, and subsequently next hop neighbors down the entire route path need to be listening for data transfer. If nodes are not awake and listening, the packet can encounter delays associated with waiting for extended sleep cycles to expire over each hop. The challenge to overcome this problem is synchronized data transfer and mechanisms embedded in the protocol to alert next hop neighbors of potential data transfer, thus keeping them awake for packet transfer.

Effects of the unreliable nature of the RF propagation medium have a negative impact on the data exchange reliability performance. The probability of successful end-to-end packet reception over a multi-hop network is severely degraded over multiple hops via the multiplicative effect causing poor link reliability. Each individual link may have good link quality, but over many hops to the destination point, the total link quality is much lower than each individual link. Mechanisms should be included within the route discovery protocols to ensure the best quality end-to-end link is established. In addition, upper layer protocols may have connection quality mechanisms built-in to assure successful transmission of data from the source node to the destination node.

What is needed is an ad hoc network protocol which addresses all of these issues.

SUMMARY OF THE INVENTION

This invention relates to a protocol for use in a wireless ad hoc network in which the centralized beaconing coordination function is removed and network responsibilities are distributed to individual nodes within the network. Standard wireless ad hoc network solutions have dependencies on "piconet coordinating" or "master" nodes transmitting a beacon signal that coordinates the "children" nodes in the network. The distributed synchronous shared beacon (DSSB) protocol solves the ad hoc networking problems by forming a flat, "every node is equal", distributed topology. The flat DSSB topology allows for any node to act as a gateway, or exfiltration point, for ad hoc network data. Therefore, there is no single point of failure for timing references, nor is there any reliance on reliable direct communications with a single node in the network. This flat topology is of value when the deployment scenario is random, moving, or not known a priori.

Discovery and maintenance of network connections with neighbor nodes are achieved via pilot beacon (synchronization) messages periodically transmitted in a dedicated slot or appended in additional slot time available after a data packet transmission. Scan algorithms are present within the protocol to acquire synchronization messages from neighbor nodes. The frequency and complexity of the scan interval is dependent on the RF waveform employed. The protocol is designed to rapidly acquire a frequency hopping spread spectrum (FHSS) signal which is difficult to acquire due to the hop frequency and pattern. Direct sequence spread spectrum (DSSS), static channel, and pseudo-random spreading codes such as those found in ultra wideband systems are also supported under this design.

When ad hoc networks form, or are present in a mobile environment, nodes tend to cluster or synchronize into cliques of nodes until all links joining the network have been established. Mechanisms are built into the protocol to establish network-wide synchronization and prevent small immature clusters from causing large, established clusters to switch time references in favor of the small cluster. Over a period of time the network becomes synchronized to a common time reference, though the nodes may retain some associations unique to the cluster or piconet. An example of piconet association may be for nodes connected to a specific sensor type that exchange data locally to make a collaborative decision before forwarding joint decisions across the remainder of the network.

The DSSB ad hoc mesh networking solution enables true peer-to-peer (P2P) mesh topologies in autonomous energy-constrained networks. The protocol was researched and developed for stringent "every node is equal" remotely deployed sensor network requirements, but has the flexibility built-in to support a wide range of applications ranging from mobile, high data rate devices to stationary, long battery life, low data rate, networks. Example network applications include unattended ground sensors, active RFID asset tracking, utility monitoring, mine safety, and mobile communications.

BRIEF DESCRIPTION OF THE DRAWINGS

FIG. 4A displays the structure of a media access control (MAC) command frame.

FIG. 4B displays the structure of a data frame.

FIGS. 25A, 25B, 25C, 25D, 25E and 25F are flowcharts showing in block diagram form the steps involved in a typical message transfer using the protocol of this invention.

DETAILED DESCRIPTION OF THE INVENTION

Figure 1:
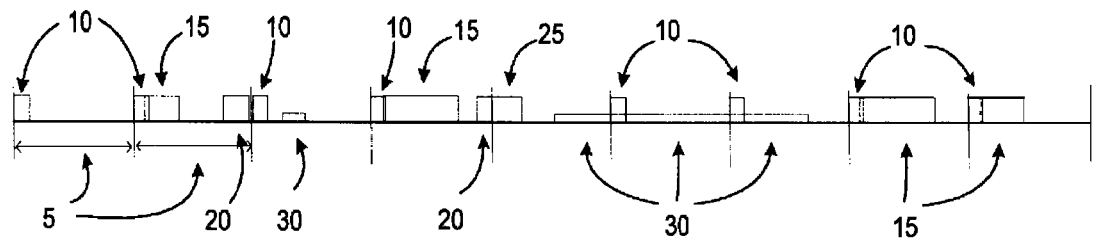
FIG. 1 is a graphic illustration of the types of time intervals within the protocol framework in which the Distributed Synchronous Shared Beaconing (DSSB) protocol of the invention operates.

The Distributed Synchronous Shared Beaconing (DSSB) protocol for wireless ad-hoc networking of this invention operates within a framework comprised of at least one superframe time interval 5, each of which is of equal duration and during each of which one or more of five primary categories of activities occur in designated time slots, as shown in FIG. 1 and further explained below. In first category 10, periodic active data exchanges occur, while in second category 15, extended data exchanges for reducing latency in sleep mode operation occur. Guaranteed time slots for dedicated bandwidth and quality of service are provided in third category 20. A pilot beacon is assigned to randomly selected slots in fourth category 25 for dissemination of network timing information. Finally, scan intervals are provided in fifth category 30 for startup and acquisition of new nodes or merging of clusters of nodes. This basic protocol framework serves as the foundation for the specific underlying algorithms of the DSSB architecture.

Figure 2:
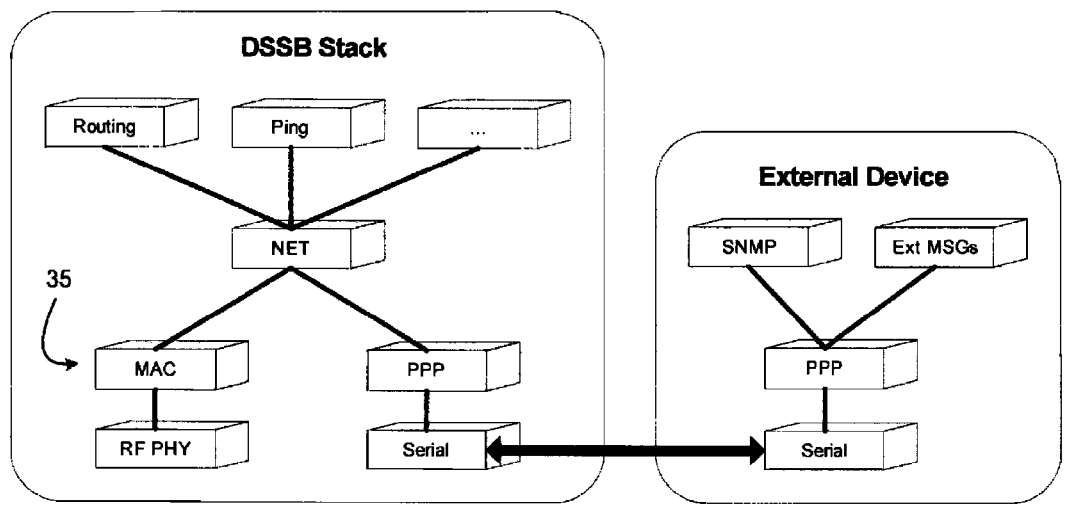
FIG. 2 illustrates a DSSB stack structure for use with this invention.

The DSSB stack structure is shown in FIG. 2. The data link media access control (MAC) layer 35 is an important aspect of that stack. It discovers and forms a time synchronized collection of data links between neighbor nodes to enable reliable links. Frame headers and packet structure are very similar to the standard IEEE 802.15.4 implementation. Mesh networks form into a flat topology where every node in the network is equal. This characteristic enables true P2P operation and eliminates central coordination requirements and single points of failure. The stack is portable and has been abstracted for implementation on multiple RF physical layers. The link layer design minimizes idle listening through synchronization of the network into coordinated and dynamic sleep intervals. The slotted architecture enables quality of service applications through dedicated slot scheduling such that prioritized and scheduled packets have guaranteed bandwidth allocated across the network.

A network layer interface is provided for routing of network packets. Specific routing techniques are application dependent. The foundational routing is based on the standard ad-hoc on-demand distance vector (AODV) routing protocol with enhanced cross-layer algorithms to provide assurances for reliable end-to-end route path selection. The modifications account for end-to-end link quality in the routing decision process, thus packet traversal across many hops pick a path that is balanced between minimized hop count and reliable link quality on each hop. Data can be routed to any node in the network.

The stack functions as a "mesh modem" and supports standard external general purpose input output (GPIO), analog to digital converter (A/D), and serial interfaces for connecting sensors and other monitoring/control devices. A point-to-point protocol (PPP) derivative is supported over the serial interface for sending and receiving configuration and application messages.

DSSB Functional Overview

Figure 3:
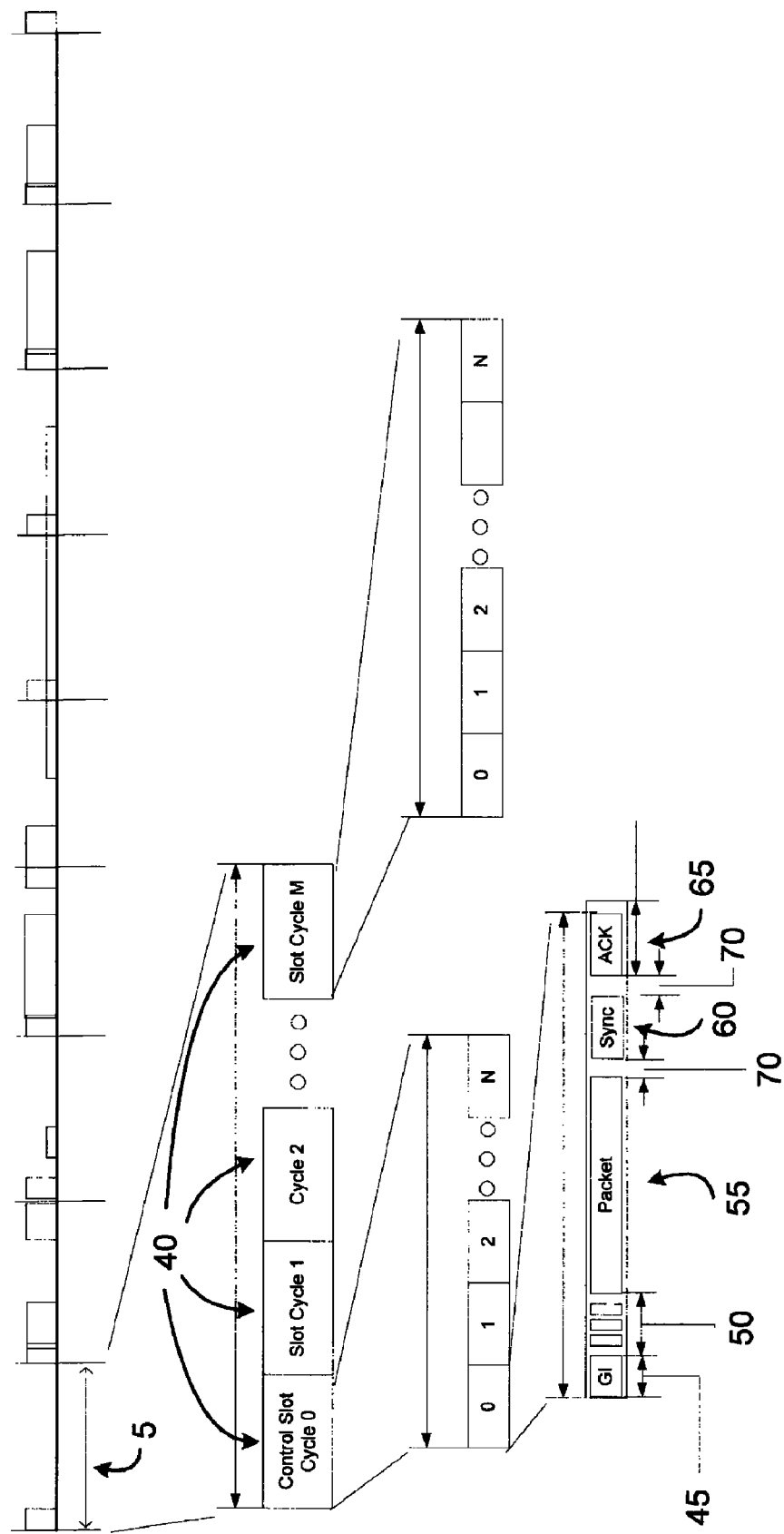
FIG. 3 is an illustration of DSSB protocol slot timing for use with this invention.

The DSSB protocol slot timing is illustrated in FIG. 3. The network communication is strictly time scheduled to minimize unnecessary listening and maximize "sleep" intervals. Each active and extended data window is contained within a superframe interval 5. Superframe interval 5 defines the sleep time and controls latency through the network. Superframe interval 5 is configurable and thus has an "accordion" effect on controlling overall network throughput, is responsive to packet forwarding, and has control over power consumption. The flexibility of superframe interval 5 is a key aspect of the underlying protocol design because it allows for scalability to diverse application domains using a common framework.

Each superframe interval 5 is divided into slot cycles 40. Depending on the application, there may only be one slot cycle per superframe interval which has many slots or there may be multiple slot cycles having few slots. The slot cycle concept provides varying levels of granularity for repeated guaranteed slot scheduling and provides defined intervals for allocated times for nodes to service child piconets or neighboring node cluster communications. Guaranteed slot scheduling is done via bitmap techniques thus breaking the timing down into configurable finite cycles allows for more effective logic comparisons in the protocol implementation.

Individual slots 40 each consist of five distinct types of intervals; a guard interval 45 to account for clock drift, carrier sense minislots 50 for collision avoidance, packet transfer interval 55, sync packet appending 60, and a packet acknowledgement window 65. In addition there is inter-frame spacing 70 between the aforementioned intervals. In its basic form this medium access technique is similar to slotted ALOHA with carrier sense multiple access (CSMA) and random backoff.

Shared Beacon Synchronization

The pilot beacon assigned to a time slot in fourth activity category 25 provides a known network synchronizing reference and a continuous update mechanism for channel control information. The SYNC trailer packets appended in interval 60 are opportunistic references to enhance update rates. The beacon packets contain slot timing, seniority metrics, and channel information of the individual nodes and piconet. They are scheduled randomly within a defined interval to avoid contention with neighboring node transmissions and maximize cluster-wide discovery opportunities for new nodes joining the mesh. The addition of the SYNC interval 60 to the slot is a novel inclusion in the protocol for an ad hoc network. Since the slot size is fixed for the system configuration setting and many packets are quite short, there is often unused time available within the slot. In instances where excess time is available; SYNC packets are stuffed between the data packet and ACK interval 65. These packets provide more opportunities for new nodes or mobile nodes in the area to discover and acquire neighbor nodes. This SYNC capability is particularly useful if the radio signal is frequency hopping or randomly coded since it provides additional opportunities for discovery in addition to the allocated pilot beacon slots.

New nodes joining the network must do a continuous long scan over a minimum of two pilot beacon intervals to search for active neighbor nodes. If neighbor nodes are present, the new node synchronizes its slot alignment to the highest seniority time metric and the new node assumes operation within the piconet. The response to pilot beacons is scheduled for the same slots as the cluster active interval. A contention access period (CAP) is scheduled for new nodes to inform the neighbor of its existence. If no neighbors are found, the node begins its own pilot beacon broadcast and search schedule. Independent clusters of nodes will be synchronized to different clocks. Random scans are required by all nodes to search for mobile clusters that have merged. When clusters merge and discover one another, the clock metric from the more senior cluster is propagated through the junior cluster. Over a short time period, the whole connected network becomes time synchronized.

If the node determines its time metric is junior to a newly discovered metric, it will assume an updated slightly degraded metric relative to the newly discovered senior time metric. Over time the network timing adjusts to the most senior metric within the network. If the source of the seniority metric fails, there is no impact to the network synchronization since the timing seniority references have been established. The frequency of pilot intervals is configurable and dependent on application. Highly mobile applications require more frequent updates due to the rapid dynamics of the network. Static networks experience little change over time, thus frequent updates are not necessary.

The system clock on independent nodes provides coarse time synchronization between active intervals. Clock drift between nodes mandates that nodes participate in every active interval to maintain slot synchronization. Synchronization maintenance is attained on any packet, thus does not require reception of SYNC packets.

Data Exchange

Data messages are purely for information exchange. The DSSB protocol is very flexible in that data exchange can occur in either a contention or slot scheduled manner. Nodes operate on a single shared medium channel or on scheduled slots using a channel code unique to the node pair communicating. The channel code information is negotiated during the neighbor association process of the protocol. This channelization enables simultaneous data transfer between adjacent node pairs while minimizing shared medium interference. The channel codes do not provide complete isolation from interference from neighboring pairs, but does provide good rejection under normal circumstances when the SNR of neighboring nodes does not overwhelm the SNR of the direct link.

Data exchange occurs only when a node has data to send. In periods of no activity, which can be the majority of the time in sensor networks, no data is sent. Nodes simply listen for the configured active period to hear if neighbor nodes are forwarding packets to them. Nodes with data to send attempt to pass packets in the CAP slots of the active time or in application with guaranteed quality of service in the time slots reserved for their transmission. The number of CAP and guaranteed slots is variable dependent on application requirements such as mobility, battery life, network discovery time, etc. Prior to the CAP interval, nodes randomly select a mini-slot offset for beginning of the transmission. The node remains in a receive state until selected transmission mini-slot occurs. If channel activity is heard on previous mini-slots, the node reschedules it's transmission to avoid contention with nodes already holding the channel. In the event of a message collision a random backoff mechanism of X minislots is employed where a random number between 1 and some configurable number of minislots is selected to delay transmission before subsequent attempts to send the packet are made. Packet ACKs are returned for all unicast transmissions.

Frame Format

There are four types of frames in the basic frame structure for communications. MAC Command frames 72, an example of which is shown in FIG. 4A, are used for neighbor to neighbor exchange of information and are not routed over multiple hops. Primary messages include exchange of local information about individual node capabilities and negotiation of priorities, bandwidth, etc.

Date Frames 75, an example of which is shown in FIG. 4B, are the primary method of information exchange. These frames contain network layer packets for multi-hop operation. Options exist in the design to include a piggyback request and acknowledgement. The piggyback concept allows MAC Command type messaging between neighbor nodes for additional instructions or bandwidth requests. Use of this mode primarily occurs in a very dynamic communication environment with quality of service demands. Encryption is supported in the design for payload of network layer packets.

Figure 4C:
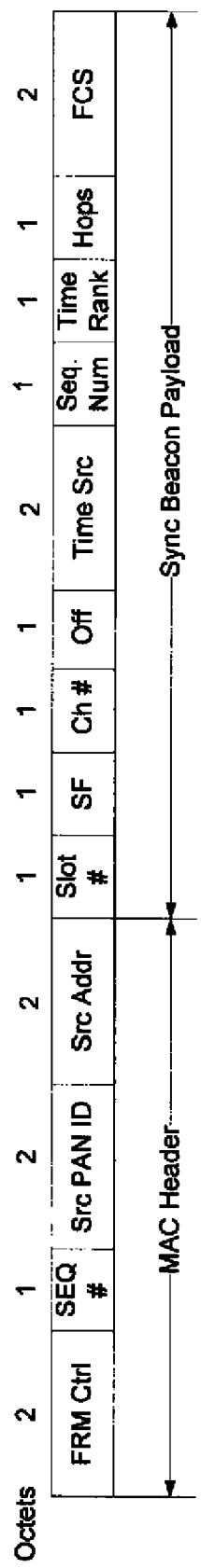
FIG. 4C displays the structure of a Sync frame.

Sync Frames 80, an example of which is shown in FIG. 4C, are the vehicle for network discovery and time alignment across the network. A sequence of the packets is sent in pilot intervals or as trailers to normal data frames.

Figure 4D:
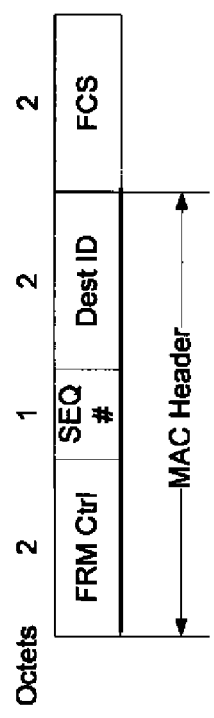
FIG. 4D displays the structure of an acknowledge (ACK) frame.

ACK Frames 85, an example of which is shown in FIG. 4D, are returned for all unicast transmissions simply as acknowledgement of successful reception of the packet.

Channel Discovery

Efficient network discovery is a key aspect of the DSSB protocol. A node joining a network has no knowledge of the surrounding nodes or if any are present at all. In a single channel network, discovery is not so difficult since the network channel assignment is known a priori. New nodes simply listen on a known channel setting for a set amount of time to determine if there are neighbors are present. If not, the node assumes it is an orphan or first node in the network and assumes control. The discovery process becomes a little more challenging under the conditions of spread spectrum communications such as frequency hopping or to a lesser extent direct sequence. The channel is continually changing under these conditions, thus the node must first discover the channel changing sequence and synchronize its communications with the remainder of the nodes. Discovering the operating channel in an efficient manner increases the overall responsiveness of the network and reduces idle listening for improved battery life. After channel discovery, random channel scans are required to listen for merging clusters of nodes. Such minimal usage has the further advantage of increasing battery life. The random channel scan procedure occurs in the background as a low priority task to minimize impact on performance degradations with previously established neighbors.

Figure 5:
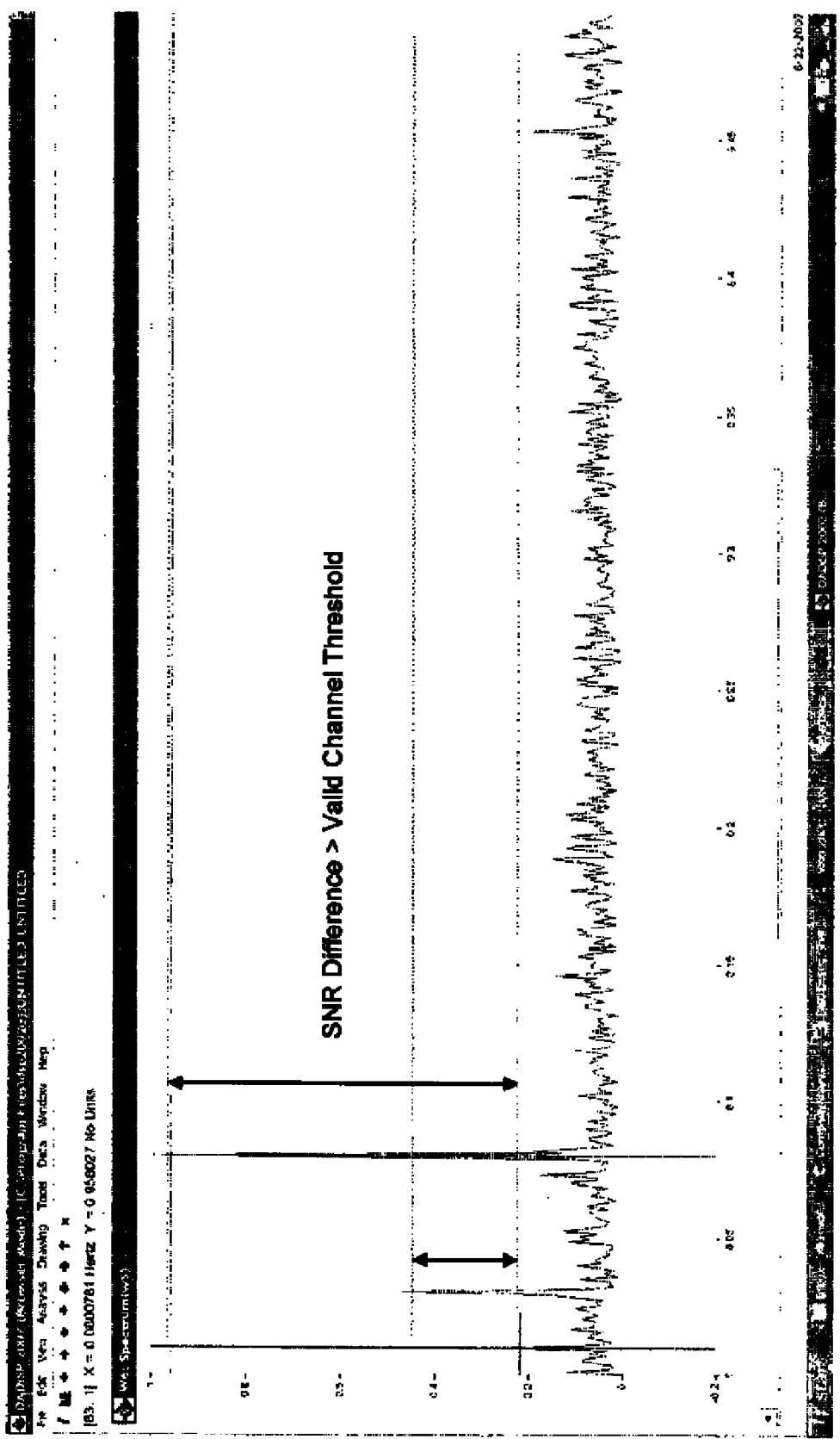
FIG. 5 is a screenshot of the channel scan criteria for a frequency hopping system.

FIG. 5 illustrates the channel scan criteria for a frequency hopping system. In a frequency hopping deployment, the active channel changes according to an established pseudo-random code sequence. The objective of the scan procedure is to find the active channel and synchronize to the coded sequence. Two approaches could be taken. One is to park on a single channel and listen for transmission on the channel. The other is to actively scan channels to go out and find the active channel. The DSSB protocol typically operates under the latter approach and actively scans the RF medium for energy, though protocol provisions are included to park on a single channel. The algorithm rapidly scans through channels looking for energy that exceeds a configurable threshold difference between the signal and the noise floor average. When the threshold is exceeded, the protocol changes modes and attempts to acquire hop sequence synchronization. Channel false acquisition can be an issue since the RF medium is shared with other channels. The algorithm has provisions to determine which channels are interfering and ignore them in the scan list. FIG. 5 provides an example of multiple RF signatures exceeding the signal to noise threshold level. The bottom horizontal line represents a threshold signal to noise ratio for declaring a potential channel carrier. When a signal exceeds this threshold, the algorithms will attempt to synchronize to the channel hop sequence. In the illustrated example the lower signal, denoted by the middle horizontal line, is not a valid channel and is thus discarded. The channel scan process continues until it finds the true signal which is depicted by the spectral spike on the top horizontal line.

Direct sequence acquisition operates in a similar manner. The threshold values are the results attained from a correlation function within the radio. The difference of the correlation output and the average uncorrelated output is equivalent to the signal to noise ratio threshold used in the frequency hopping system.

Figure 6:
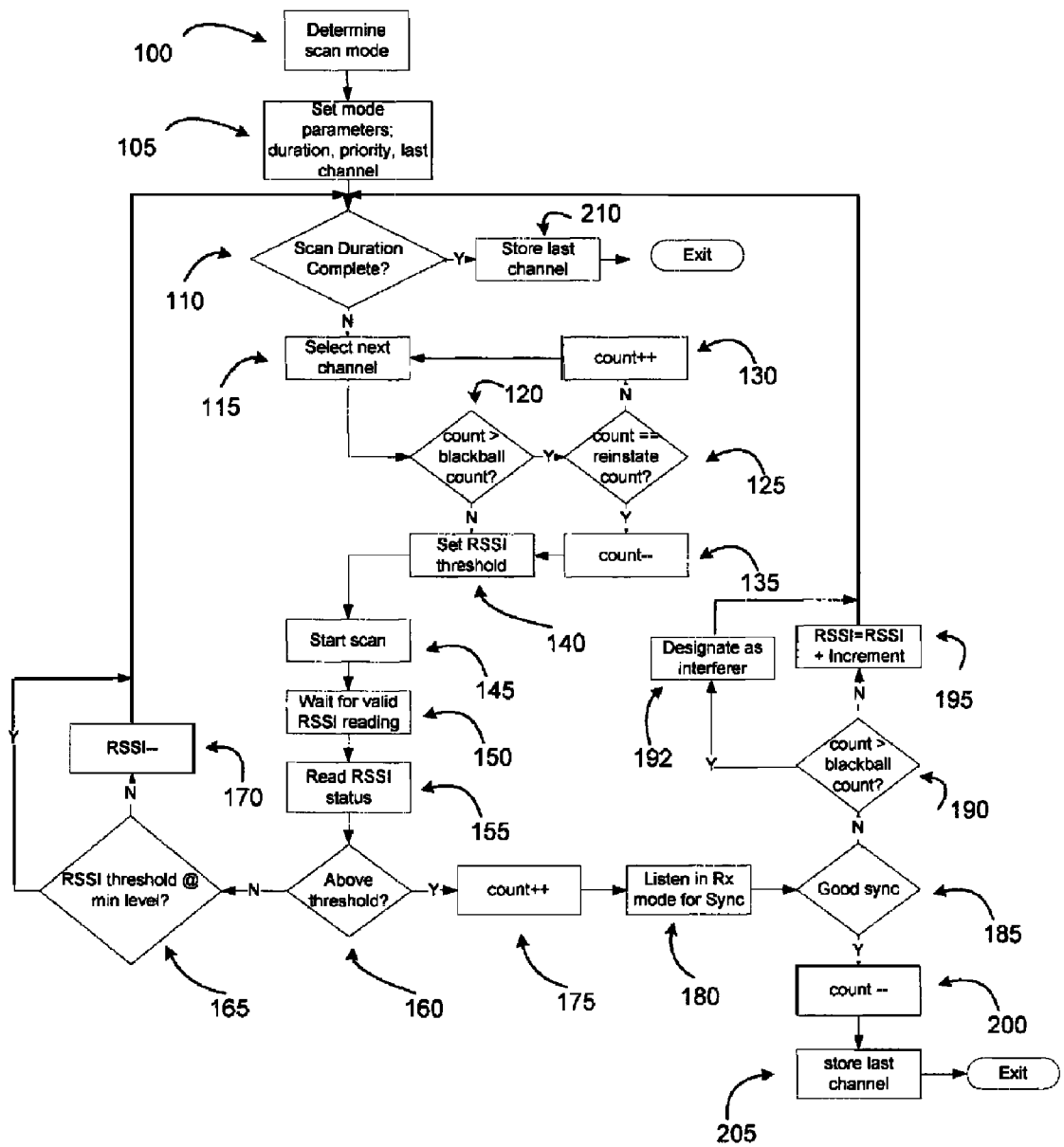
FIG. 6 is a flowchart showing in block diagram form the steps of the channel scan process.

FIG. 6 presents a flowchart in block diagram form depicting the channel scan process which proceeds along a preconfigured sequence of hop channels. Upon entry into the scan process, the scan mode is determined at 100. The node is in one of three scan states: initial long scan, fixed channel long scan, or randomized merge scan. Scan parameters, including a configurable scan duration period, a configurable dwell time, a noise floor average, a scan priority, a blackball count, a blackball count limit, a reinstatement count and a reinstatement count level are set at 105 according to the determined mode. The noise floor average results from a dynamic calculation undertaken during the course of communications. The RF medium is sampled and the noise floor calculation results from a sliding window average over a finite sampling interval. The scan interval, or scan duration period, occurs for a fixed duration, expiration of which is determined at 110 and during which the algorithm attempts to loop through as many channels as possible to acquire the channel of interest. Channel selection occurs at 115. The blackball count associated with the current channel is examined at 120. Each channel initially has a zero blackball count assigned to it at 105. If the channel's blackball count thereafter exceeds the blackball count limit, it is considered a potentially interfering channel. However, a channel can be reinstated for testing after its blackball count exceeds the blackball count limit. Thus, at 125 the blackball count for the channel is compared to the reinstatement count. If the blackball count is less than the reinstatement count, the blackball count is incremented by a count of one at 130 and the next channel is selected at 115. If the blackball count is equal to the reinstatement count at 125, the blackball count is decremented by a count of one at 135. Since on the first pass for a channel its blackball count is zero, it passes through to block 140 where a Received Signal Strength Indicator (RSSI) threshold is set. The decision threshold parameters, such as a minimum threshold level and a threshold level increment amount, are set statically. Thereafter, the measure of signal strength and noise level are used as inputs, and the difference between these two inputs indicates if a valid signal is present or not. The actual scan for a channel is initiated at 145. However, each scan requires a dwell time on each channel at block 150 in order to allow the radio to acquire enough information to declare an RF energy level, i.e. an RSSI status, at 155. If the RSSI does not exceed the configurable threshold difference between the signal and the noise floor average, as determined at 160, the process tests whether the RSSI threshold is at a minimum level at 165 and, if so, returns to 110 to attempt to go to the next channel, while, if not, the configurable RSSI is reduced by one level at 170 and the process returns to 110. One "level" is a "configured increment parameter". Each channel has a stored threshold level. This is a mechanism to ignore channels that have RF interferers on them. As channels are scanned within a band, some channels always have a signal on them from another source. By incrementing the decision threshold, the level eventually gets to a high enough level that the RSSI reading will not exceed the threshold so that no further effort will be made to acquire sync on that channeld for some "blackball count" period of time. Conversely, in the event the interferer goes away, a means is needed to bring the threshold back to the minimum level in the event the interferer goes away after the blackball time has expired. That means is the decrement occurring at 170. If the RSSI is above the threshold, the process increments the blackball count by a count of one for the present channel at 175 and listens in receiver mode to acquire network synchronization at 180 to determine at 185 if good synchronization has been achieved. If not, the blackball count associated with the current channel is examined at 190 to determine if it exceeds the preset blackball count limit. If that limit is not exceeded, the present channel is designated as a potential interfering channel at 192 and the RSSI is incremented by a configurable amount at 195 and the process returns to 110 to try the next channel. If the blackball count limit associated with the channel under test is exceeded as determined at 190, that channel is designated as a potential interfering channel so that that channel is skipped in the scan sequence for a set number of tries until it is reinstated by equaling the reinstatement count as determined at 125. If good synchronization is found at 185, the blackball count for the channel is decremented by one at 200, the last channel with good synchronization is stored at 205 and the process is exited. Similarly, when the last channel has been checked within the allotted time at 110, the identity of the last channel checked is stored at 210 and the process is exited.

Network Time Synchronization

Figure 7:
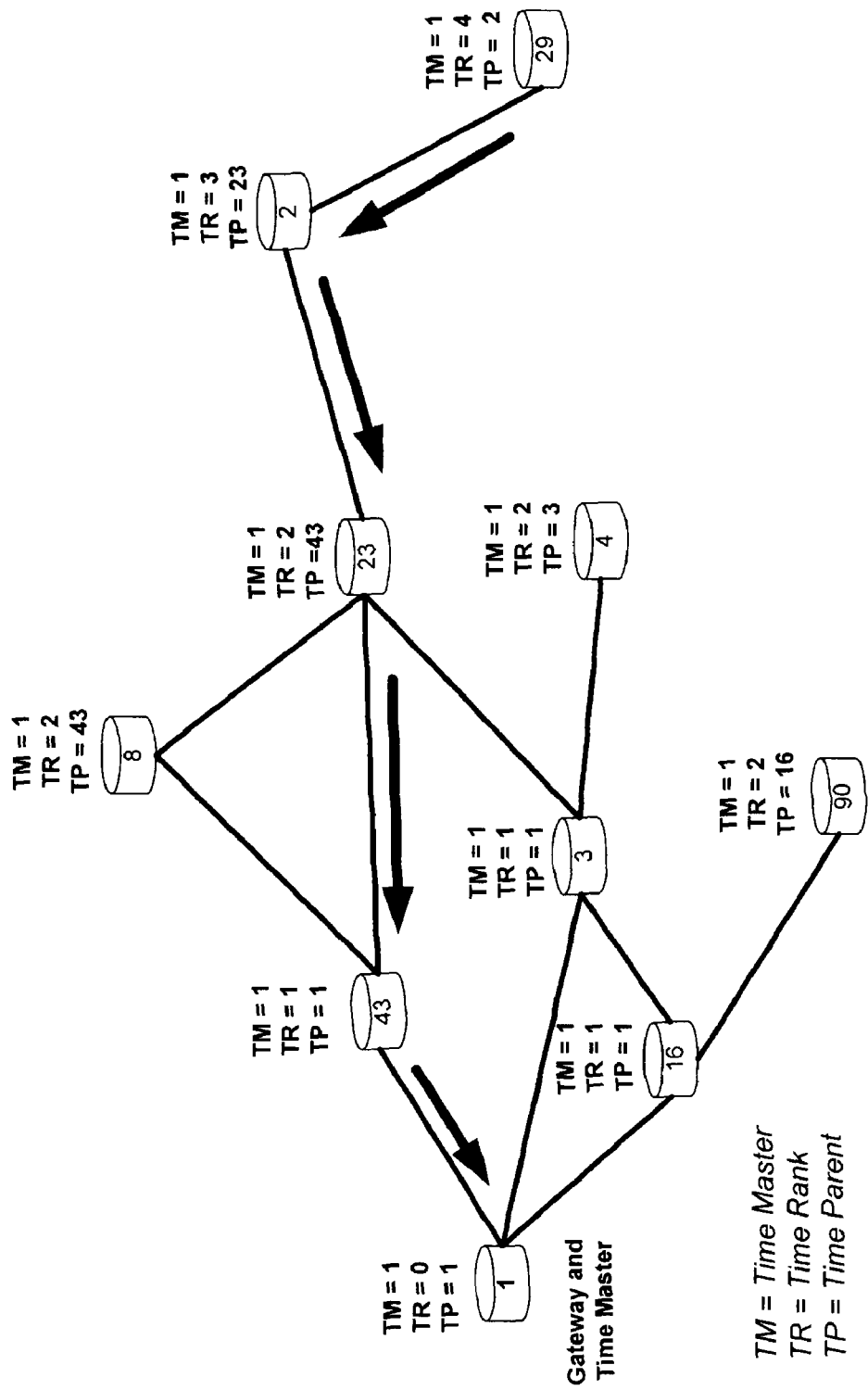
FIG. 7 shows a synchronized network of nodes with the presence of a Gateway.

Distributed time synchronization is a primary innovation in the DSSB protocol. Since each node is autonomous, the network time synchronization approach must also have the same independent properties for time alignment without the presence of a central coordinator. A single node does act as a "Time Master" simply by reference, but if this node were to fail, the network will automatically transition to a new node claiming the Time Master role without disrupting normal operation of the data transfers. Thus, the technique is truly a distributed algorithm. For applications that possess a dedicated network Gateway, the Gateway node has the highest seniority metric and will assume control of the network. An example of a synchronized network of nodes with the presence of a Gateway is shown in FIG. 7. In this example, the default route to the time parent is shown by arrows where the destination is the gateway and the time master. The following three primary parameters control the decision process:

Time Master (TM): This is the identification (ID) of the node controlling the cluster synchronization. All nodes start out as the time master, but their status changes upon receipt of a sync packet from neighbor nodes. The node with the senior Time Master reference wins the negotiation and the losing node takes on the Time Master reference of the winning node.

Time Rank (TR): Time Rank provides a metric of number of hops away from the Time Master. The Time Master takes a Time Rank of 0, a node 1 hop from the Time Master assumes a Time Rank of 1. The value is incremented by 1 for subsequent hops from the time master. Time Rank gives a shortest path metric to the Time Master for minimized time slot jitter and also in systems where the Gateway is the data destination point, the route path is known through the time synchronization algorithm. The arrows in FIG. 7 example represent the data flow from Node 29 to Node 1 (Gateway).

Time Parent (TP): Time Parent is the final tie-breaker decision point for node synchronization and can serve as the default next hop route for packets flowing to the Gateway.

Generalized operation rules are summarized as follows:

1. Lowest Time Master Node ID always wins (Master Gateway is 0)

2. Lowest Time Rank (hops from Time Master) wins if same Time Master value

3. Lowest Node ID is tie-breaker

4. Upon time change, nodes assume a Time Rank of the Time Parent's Time Rank+1

5. Multiple network gateways may exist, but only one is a Master Gateway

Figure 8:
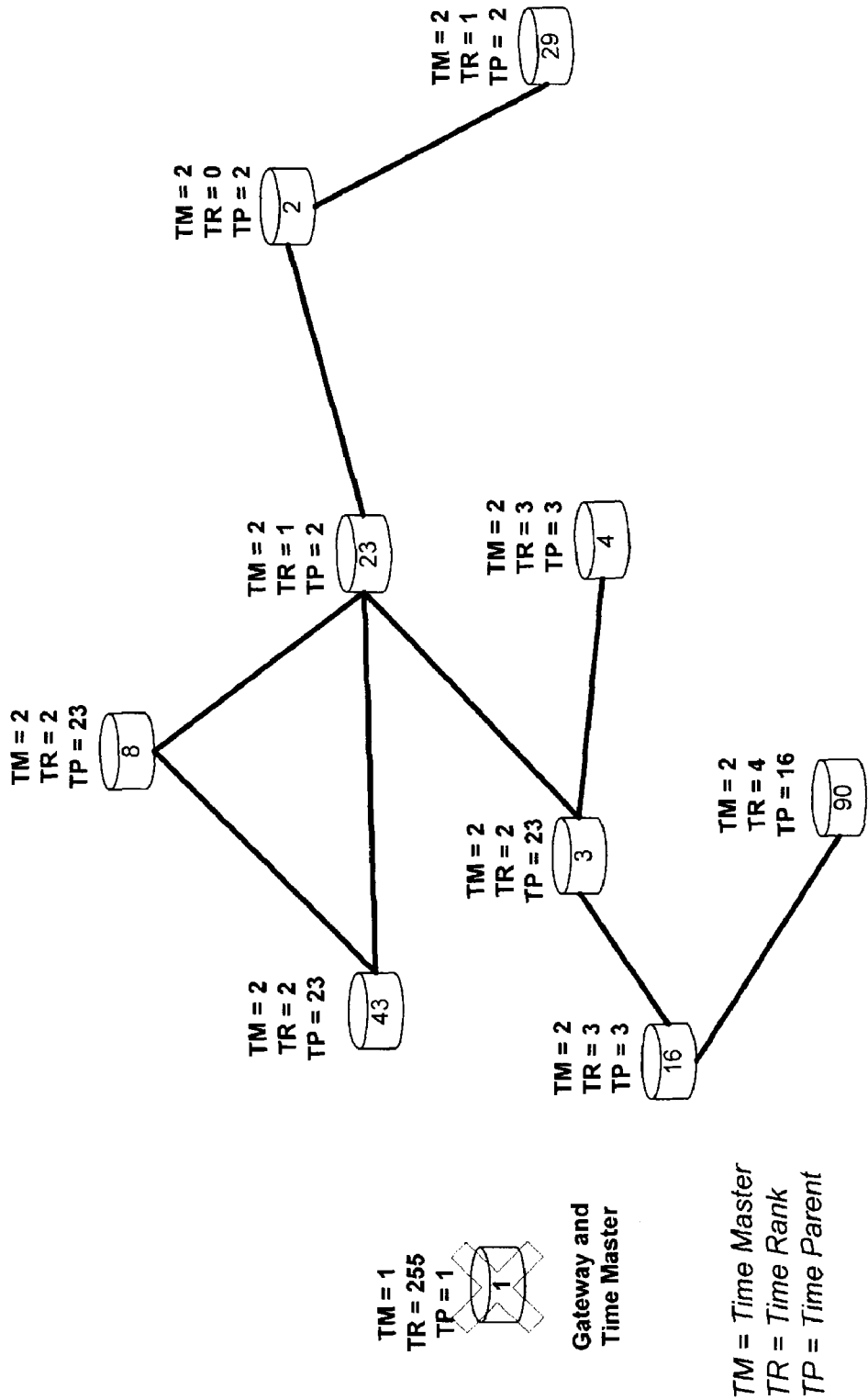
FIG. 8 shows network synchronization re-establishment after the failure of the Time Master node.

6. If any node, including the Gateway, is an orphan (no neighbors), it adjusts its slot timing to the established network timing of other nodes, but establishes itself as the time master 7. Time master search is re-established if stale sequence number timeout is exceeded 8. If the Master Gateway is the destination address of a network packet, the Time Parent may be used as the default next-hop route FIG. 8 provides an example of network synchronization re-establishment after the Time Master node fails. In this case, network synchronization reestablishes to the lowest Node ID number where those ID numbers appear in the figure within each node. A sequence number is provided in all synchronization packets. The Time Master is the only node that can update the sequence number. If the sequence number is not updated within a set amount of time, it is assumed the Time Master has failed and the network time negotiation process restarts at each node. Since the network timing is already stable, the re-negotiation process occurs in the background of normal data traffic. In the case of FIG. 8, Node 2 eventually becomes the new Time Master and assumes a Time Rank of 0.

Figure 9:
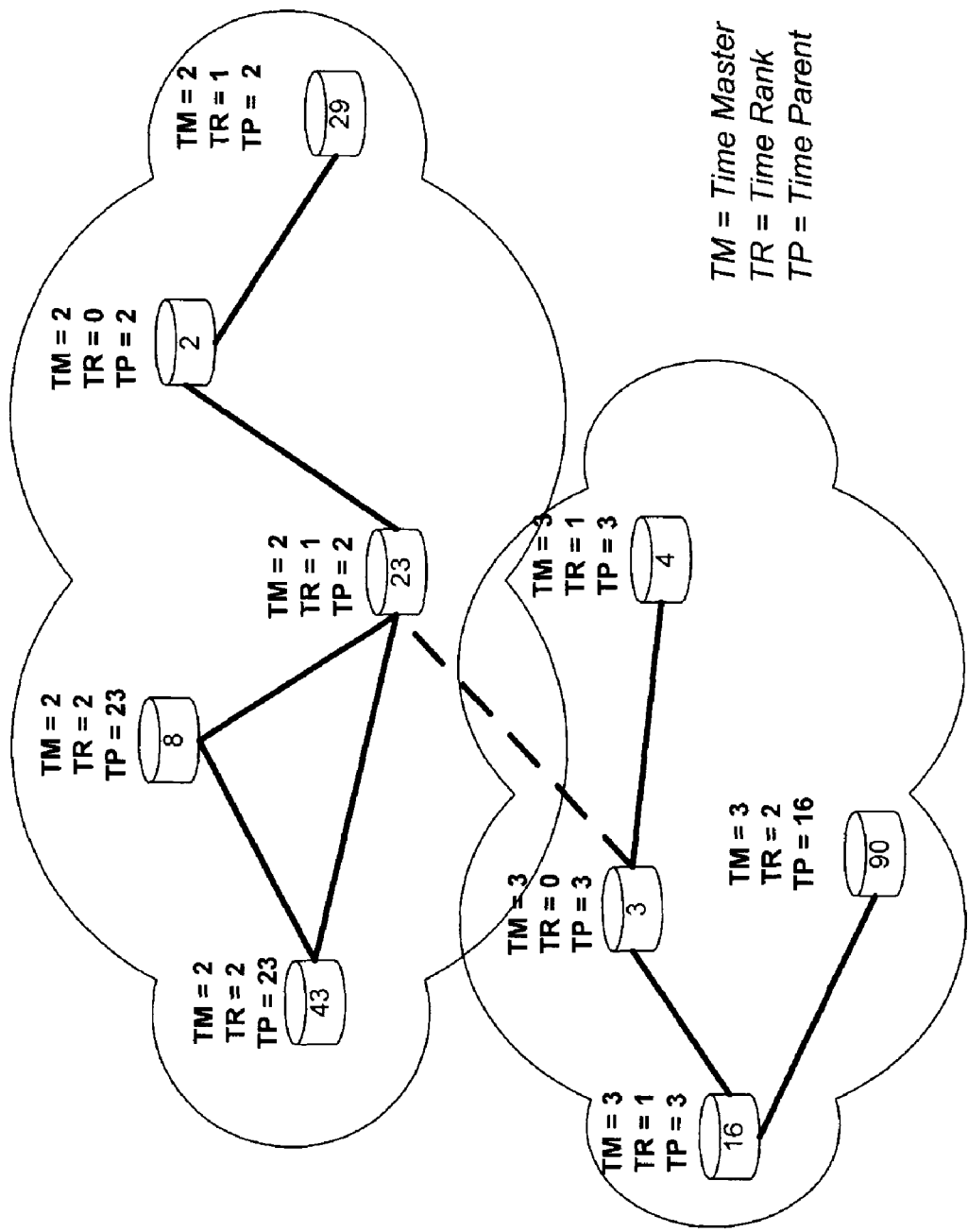
FIG. 9 shows network clustering upon initial network formation prior to a network merge.

FIG. 9 shows a typical scenario of network clustering upon initial network formation prior to a network merge. There is no gateway present so clusters form before the merge. As nodes discover one another, they will synchronize to the lowest Time Master ID. As new nodes come online and fill link gaps between clusters, the clusters merge and the nodes transition time alignment to the higher ranking cluster. Here, after Node 3 and Node 23 discover each other, the clusters merge into the type of network shown in FIG. 8. Slot timing alignment may be out of alignment between clusters which can temporarily impede network connectivity. The DSSB protocol has provisions within it to announce departure from a cluster and relay new slot timing information to the original cluster neighbors. This departure handshake expedites transition of the remaining cluster nodes to the new higher ranking cluster.

The potential exists for a small cluster to cause a large cluster to shift alignment. The DSSB protocol has provisions for a "Cluster Rank" to force a small cluster to join to the larger senior cluster. This provision occurs in background updates by bubbling up the number of nodes "hanging" on the cluster time tree to each time parent in the chain. Each node passes the total number of children and grandchildren connected through it on the cluster tree. The total cluster metric is summed at the time master and redistributed as the total cluster metric from the time master.

Figure 10:
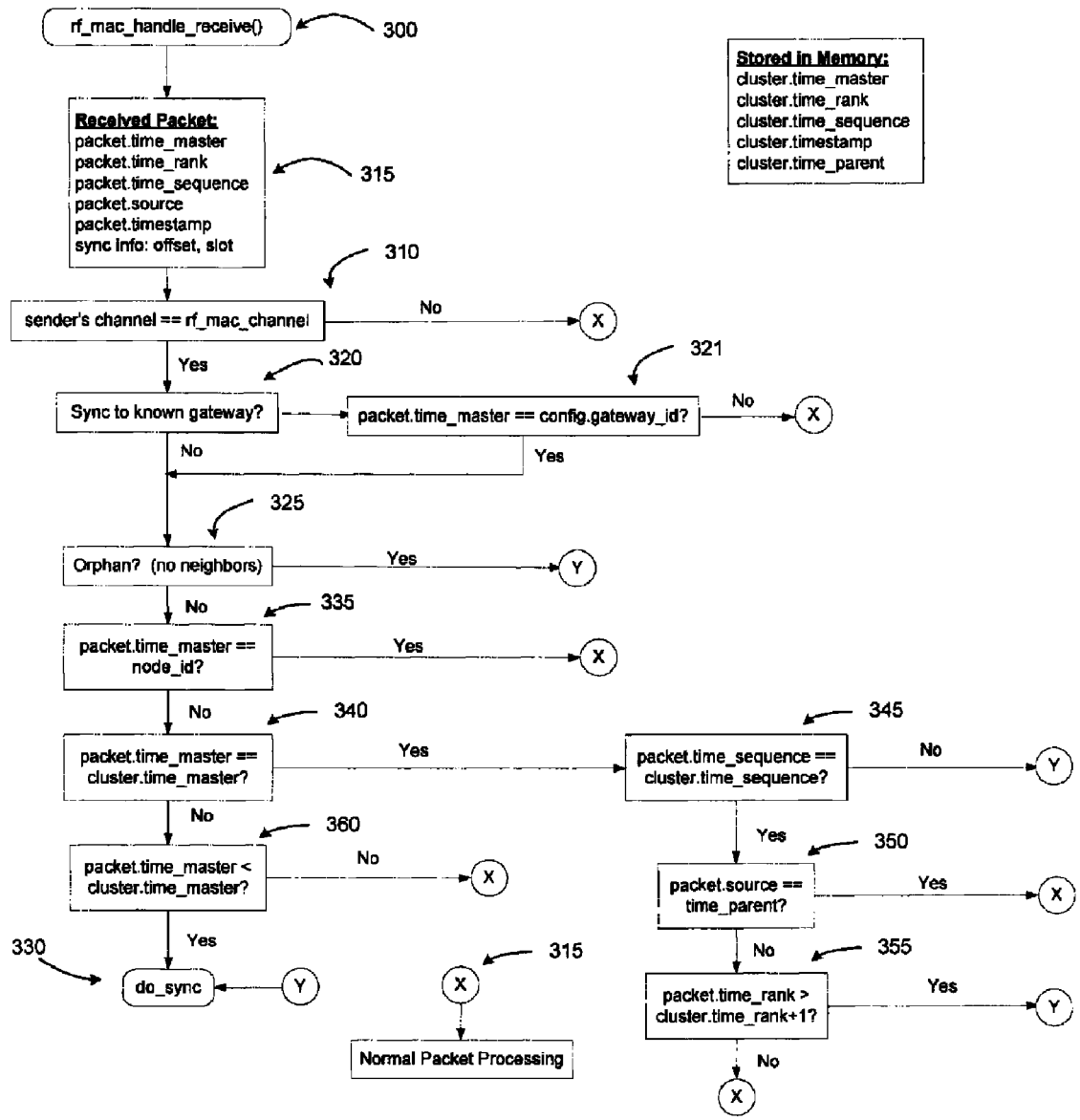
FIG. 10 illustrates the decision algorithm for network synchronization under DSSB using pseudocode.

FIG. 10 illustrates the decision algorithm for network synchronization under DSSB using pseudocode. If the criterion dictates that the node is to perform slot synchronization (do_sync), the node performs the actions shown. On periodic intervals (pilot slots), or following a data packet in the same slot, a node will transmit synchronization packets for the benefit of neighbor nodes. These synchronization packets contain information regarding the cluster Time Master, Time Rank, Time Sequence Number, sending node source ID, packet transmission time, slot alignment offset, slot number, and channel number. Neighbor nodes use these synchronization packets to determine if they should slot-align with the sender and, if so, the packet has the information for time synchronization. The decision process is as described in the previous examples. More specifically in FIG. 10, at 300 an incoming synchronization packet is received. After reception of the packet, data for processing the packet is parsed and established at 305. Synchronization packet values are used for comparison to the receiving node's information stored in memory. If the sender's channel does not match the receiver's configured operating channel, as determined at 310, the algorithm is exited and normal packet processing continues at 315. Normal packet processing means that processing returns back to the function which called the particular function or activity and that parsing of the remaining contents of the received packet is continued. If there is a match, a further test is performed at 320 to test node configuration parameters for gateway synchronization rules. If the receiving node is not configured to synchronize to a known gateway, it will continue processing at 325. If the receiving node is configured to synchronize to a known gateway time master and the sending node's time master is not the configured gateway ID as determined at 321, the algorithm exits to normal packet processing at 315 since it will only synchronize to the desired gateway. If the receiving node is configured to synchronize to a known gateway and the sending node's time master is equal to the configured gateway ID, the algorithm processing continues at 325. At 325 a test is performed to determine if the receiving node is an orphan. If the receiving node is an orphan, synchronization occurs at 330 and nodes should join the network at the first opportunity. If not, the receiving node has already joined a cluster. Another test occurs at 335 to determine if the time master id and the node id are identical. If so, the receiving node is the cluster time master and the sending node has previously synchronized to the receiving node and thus the algorithm is exited and normal processing continues at 315. If not, the receiving node is not the time master and a further test is performed at 340 to ascertain if the sending time master ID number is the same as the receiving node's known cluster time master ID number. If so, and the packet time sequence is not the same as the cluster time sequence as determined at 345, the time master has updated the sequence number and thus the receiving node updates its synchronization at 330. Otherwise, a better source for synchronizing is sought at 350 by determining whether the packet sending source is the same as the time parent. If so, the receiving node waits for the sequence number to change by proceeding to 315. If not, the packet time rank is compared to the cluster time rank plus one at 355. If the packet time rank is greater, synchronization with the source node closer to the time master occurs at 330. If not, the nodes are already synchronized and processing proceeds at 315. However, if at 340 the sending packet time master ID number is not the same as the cluster time master ID number, the sending node has a different time master and the receiving node determines which time master to follow at 360. If the newly introduced time master ID is less than the current cluster time master ID, the receiving node synchronizes to the new time master at 330. If the sending time master ID is greater than the current cluster time master ID, the sending node time master is inferior and the sending node will figure out in its own synchronization processing that it should follow the receiving node. In the receiving node normal packet processing resumes at 315.

Figure 11:
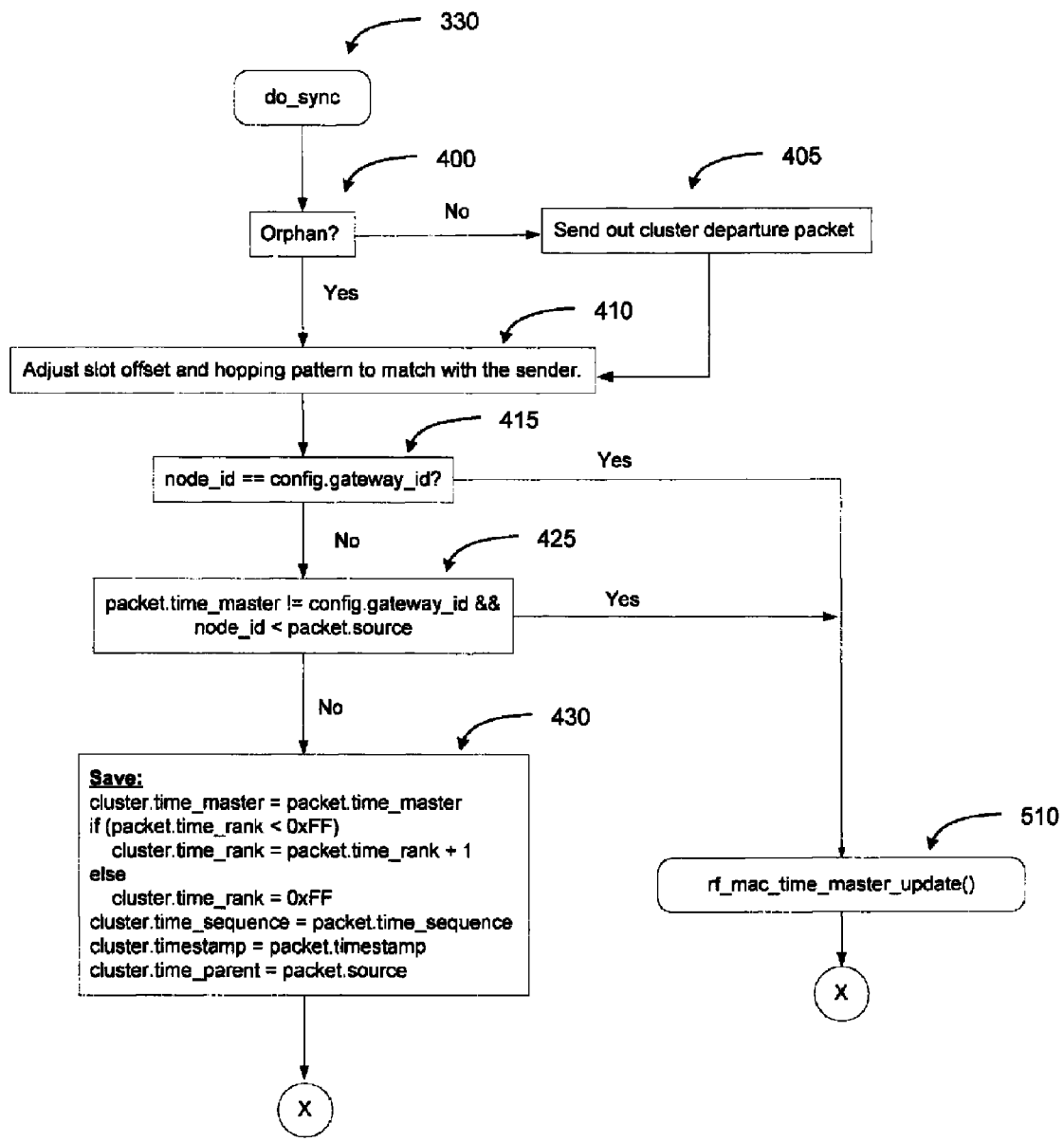
FIG. 11 illustrates the time synchronization adjustment algorithm under DSSB using pseudocode.

FIG. 11 illustrates the time synchronization adjustment algorithm of 330 under DSSB using pseudocode. If the criterion dictates that the node is to perform slot synchronization (do_sync), the node performs the actions shown. More specifically in FIG. 11, at 400 a determination is made whether the node is an orphan. If not, a cluster departure packet is sent out at 405 prior to adjusting synchronization to a new cluster. If the node is an orphan, the time slot offset and the channel hopping pattern are adjusted to match that of the sender at 410. If the receiving node ID is the same as the configuration gateway ID, as determined at 415, the receiving node is the gateway node, it assumes the time master ID, the MAC time master data is updated at 420 and normal packet processing occurs at 315 of FIG. 10. If the node ID is not the same, a further determination is made at 425 whether the sending time master ID is the configuration gateway ID. If it is, it is the gateway and the receiver updates it time metrics at 430. If it is not, a gateway is not in the cluster, and if the receiving node ID is less than the sending node ID, the receiving node wins the tie breaker and assumes the time master role at 420, else if the sending source node ID is greater than the receiving node ID, the sender wins and the receiver follows at 430. Thereafter, normal packet processing resumes at 315.

Figure 12:
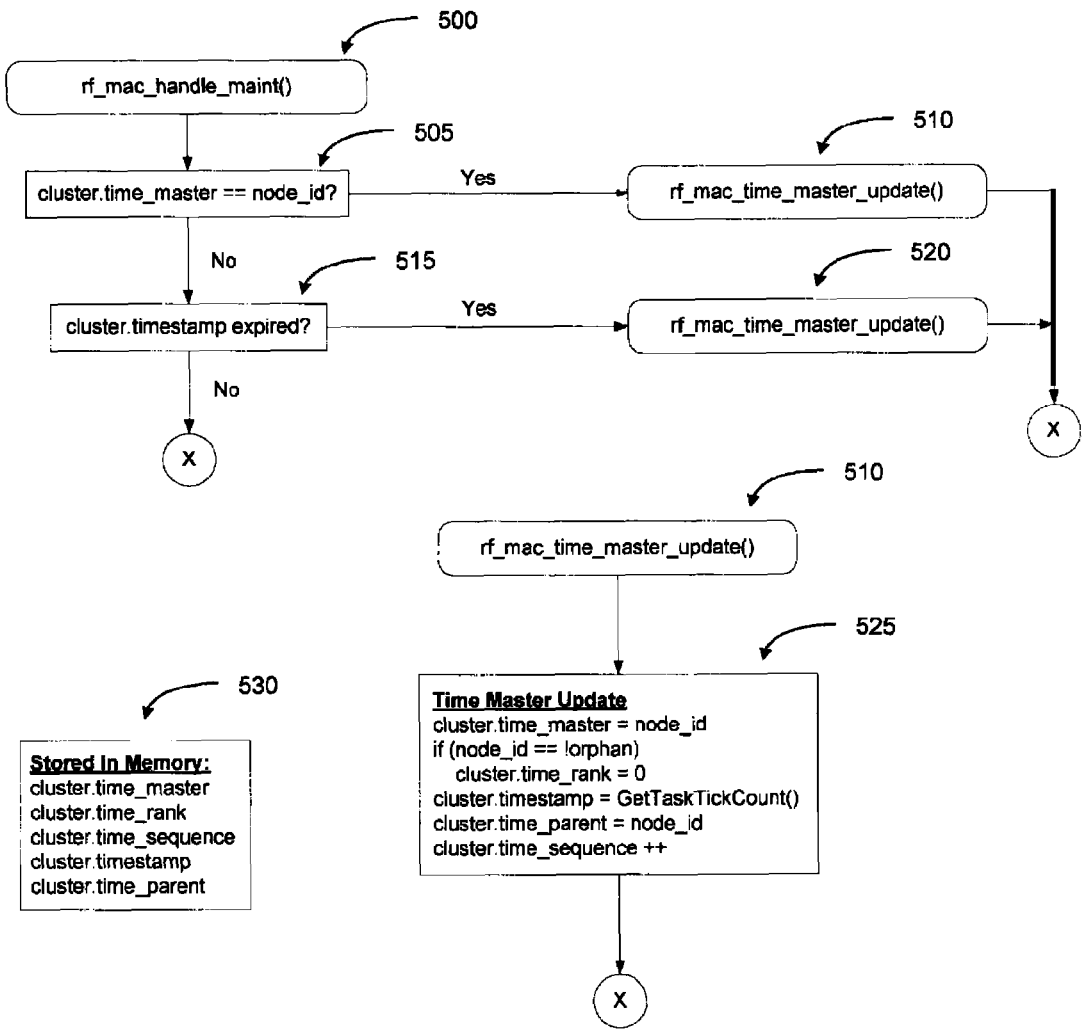
FIG. 12 illustrates the time maintenance algorithm under DSSB using pseudocode.

On periodic intervals, as illustrated generally in FIG. 12 using pseudocode, the node must perform maintenance on the time synchronization parameters. This maintenance determines if the cluster has "expired" and elects a new Time Master as appropriate. More specifically the routine of FIG. 12 is called at every superframe at 500. If the cluster time master ID is the same as the node ID as determined at 505, time maintenance is performed at 510 and normal packet processing continues at 315 of FIG. 10. If not, the cluster timestamp is examined at 515 to see if it has expired. If it has, the current node assumes it has lost its neighbors and becomes the time master and time maintenance is performed at 520. If not, normal packet processing continues at 315. The specific steps undertaken during time maintenance of 510 and 520 are described with pseudocode at 525. The list of currently stored cluster parameters at the receiving node is shown at 530.

External Synchronization

The DSSB protocol supports the ability to synchronize with an external time source and reference time that is common across the entire network. Synchronization messages are disabled and slot timing is aligned to a universal reference. A practical scenario of this reference is via the use of GPS. In this mode, receipt of the continuous 1 pulse-per-second reference and the associated Coordinate Universal Time (UTC) value allows the DSSB to synchronize to an absolute common time reference and channel hopping sequence. The network overhead of sending SYNC message and maintaining network timing with neighbors is eliminated.

Synchronous Power Saving

Figure 13:
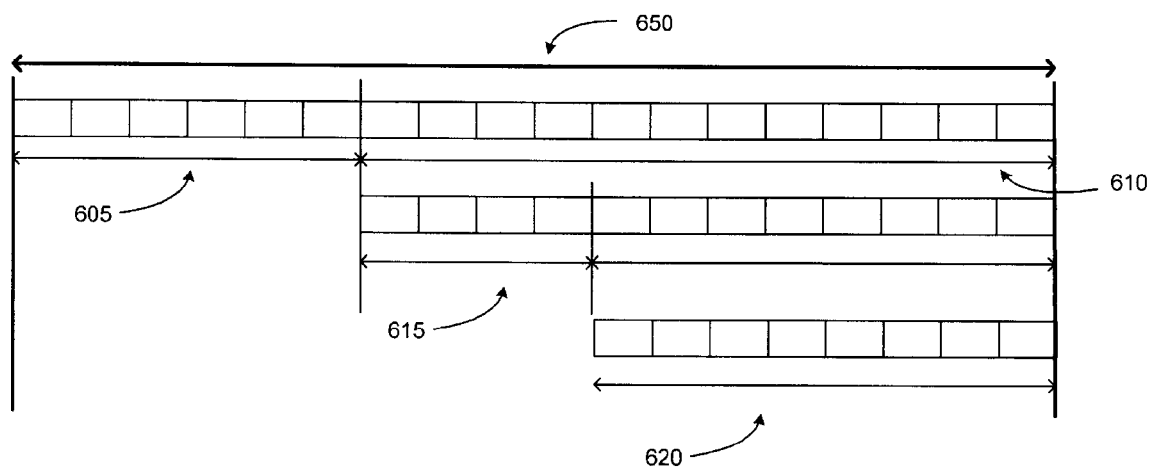
FIG. 13 illustrates in graphical form synchronous sleep intervals with automatic active extension.

Energy constrained devices require judicious use of resources. Many of these devices are limited in battery life, processing power, and bandwidth. Major causes of energy waste are packet collisions, idle listening, network control overhead, and overhearing of neighbor traffic. Slot synchronization greatly reduces listening in true peer-to-peer (P2P) ad hoc networks. FIG. 13 illustrates the shared beacon sleep interval of the DSSB protocol. All nodes synchronize to a common beacon interval for active, "awake", operation. The beacon interval alignment is included in the standard SYNC messaging in the protocol.

The DSSB protocol goal is to wake up the direct path to the destination node quickly, pass the data, and go back to sleep. If this chain of events can be accomplished in a single active period, the active/inactive intervals can be extended to allow nodes to sleep for longer periods of time. In the DSSB protocol the active interval is automatically extended a configured number of slots upon hearing network activity. The active interval extends up to the total number of slots in the beacon interval. Unacknowledged packets do not retry until the next active period to prevent poor links from causing the network to stay active and thus consume power. This approach reduces node wake-up latency and serves to notify nodes along the route path as quickly as possible of a pending data transfer. With proactive routing algorithms the next hop route is known a priori. This provides a means to enable rapid wake-up of multiple hops along the route path without incurring excessive sleep intervals for one packet transactions. This is a key strength and innovation of the DSSB design. FIG. 13 graphically illustrates this concept. The entire beacon interval is represented by 600. Within this interval there are normally a number of active slots 605 and a number of inactive slots 610. If there is network activity, the number of active slots can be extended to partially include inactive slots as in 615 or to encompass all of the slots in the beacon interval by including the slots in 620.

Quality of Service (QoS)

Maintaining QoS across a multi-hop network is very challenging. Links are highly unreliable due to fading on the RF channel, mobile nodes continually going in and out of range, contention in a shared medium from neighbor nodes, etc. Multiple hops compound bit errors within the packets and high priority applications require guaranteed time slots be aligned along the route path for timely delivery of packets. Optimization of routing protocols for appropriate QoS routing of packets can benefit greatly from knowledge of the physical layer parameters, and in turn relay that information to the link layer bandwidth scheduling. Location aware nodes, such as those coupled with GPS or those based on geo-locating radio technology, provide valuable information for packet routing.

Figure 14:
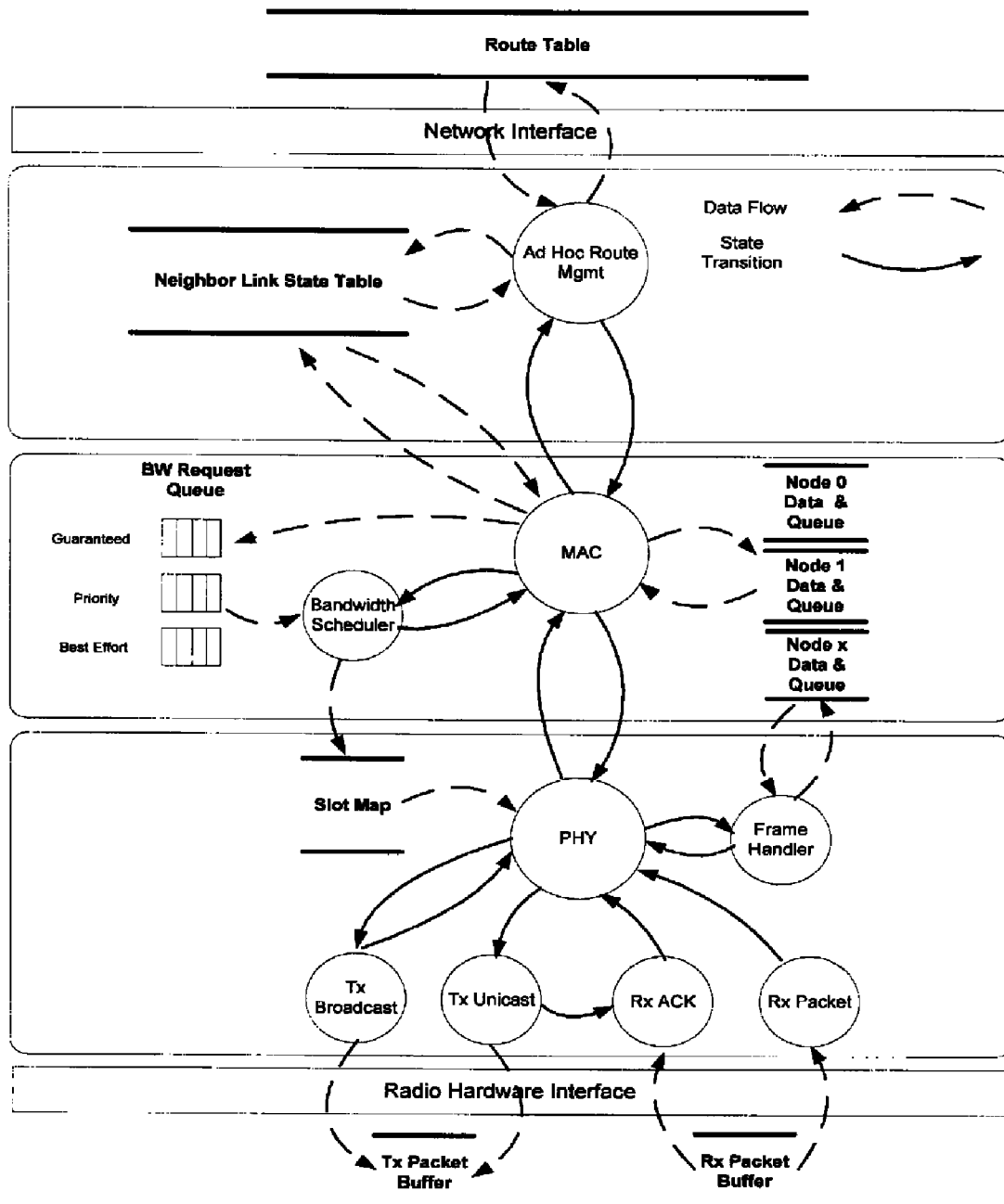
FIG. 14 is a graphical illustration of logical layer interaction to support quality of service in the DBBS protocol.

Technical challenges associated with mobile ad hoc networks originate from the broad number of layer variables and permutations of variable combinations possible for providing "optimal" network performance. Fully characterizing all permutations is not feasible within a resource constrained device. FIG. 14 illustrates logical layer interaction supporting QoS. To achieve QoS, three primary design aspects of mobile ad hoc networks must be incorporated. Each aspect requires inputs from each layer of the protocol stack to make appropriate bandwidth decisions. These inputs are:

1. Service Classification: Diverse application demands require a domain-aware and flexible approach. Different classes of traffic have different service requirements. Classification marks a packet based on its application to receive proper treatment to meet its service requirements.
2. Packet Queuing: The multi-hop network drives dynamic and compounding QoS demands. When traffic comes in burst from multiple sources queuing provides a holding place from which packets are pulled. Packets are placed in different Queues based on their classification.
3. Bandwidth Scheduling: Energy/resource constrained devices require disciplined utilization of resources. Allocating and scheduling resources based on quantity and type of packets in the queues in an efficient manner and at the appropriate classification level is contained within this capability.

QoS classification of end-to-end network traffic is heavily dependent on the application requirements. Latency, jitter, and throughput requirements drive most applications. Many applications have stable and known traffic patterns and suffer little impact in terms of application success or failure if packets are delayed or not received in a certain consistent order thus data transmitted on a "best effort" basis with no guarantees of timely delivery is sufficient. Others, such as voice data, are highly dependent on order and delay for intelligible communications. Classification of bandwidth requirements is established by upper layer protocols, including network layer routing, reservation based protocols, or a master bandwidth coordinating node within the network. The key design parameter to keep in mind for the DSSB protocol is to support flexibility within the packet queuing and slot scheduling algorithms to handle packet classification demands.

The DSSB protocol supports up to four packet queue priorities. They are

1. Unsolicited Grant Services—Provides real-time transmission opportunities by periodically assigning a fixed amount of slots to a service flow. Voice services fall under this category.
2. Real Time Polling—Provides guarantees on throughput and latency, but with greater tolerances on latency relative to unsolicited grant services. Video streaming would be classified into this queue.
3. Non-Real Time Polling—Provides guarantees on throughput only and are insensitive to time requirements. File Transfer Protocol (FTP) based file transfers are an example application.
4. Best Effort—Provides no guarantees. Uses the best available bandwidth after higher priority queues have been serviced.

Assurances are made that no one queue is starved through a Fair Weighted Queuing algorithm.

Distributed Bandwidth Scheduling

Figure 15:
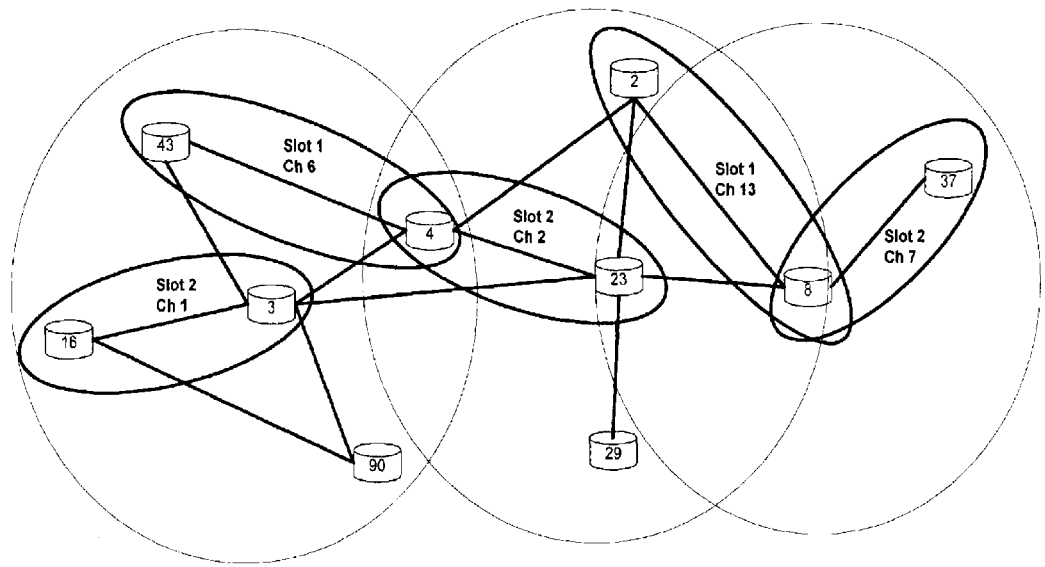
FIG. 15 is a graphical example of a network topology for slot and channel scheduling for simultaneous data transfer in a shared medium.

Different applications have varying packet service quality requirements. Since network topologies are dynamic in nature in ad hoc networks, the DSSB protocol supports a distributed technique for satisfying the service demands. The distributed nature removes dependencies on single coordinating nodes within the network and allows the network traffic to adapt to changing topologies in a timely manner. Guaranteed bandwidth is particularly important when the network size scales to large and or dense node deployment. In a large scale environment, transmission contention between nodes competing for the shared medium degrades the packet success rate and reduces overall network throughput. In addition to dedicated time slots, the DSSB protocol includes unique operating channels for the node pairs communicating in a time slot such that simultaneous transmissions between adjacent pairs can occur within the medium. An example network topology for slot and channel scheduling for simultaneous data transfer in a shared medium is illustrated in FIG. 15. Node pairs are scheduled to transfer data in overlapping slots. As long as channel separation exists and nodes are sufficiently spaced such that adjacent channel interference is minimized, communication occurs. This structure improves multi-hop reliability by minimizing contention in the shared medium thus improving network capacity. Slot and channel scheduling should be done jointly for best operation. If slot scheduling is done alone, the potential for "hidden node" communications in the same slot is possible. A higher layer centralized control mechanism is required to overcome this issue in single channel operation.

The challenge posed to the protocol is scheduling slots and non-overlapping channels with neighbor nodes. Slot scheduling requires nodes to allocate and negotiate guaranteed time slots with next-hop neighbor nodes to satisfy the application service demands. For example, an end-to-end voice path through the network requires nodes to commit X slots on each hop along the path to meet the bandwidth demands of the voice stream. This would be accomplished through a higher layer reservation protocol. Individual nodes are only concerned with allocating bandwidth with immediate neighbors based on the needs of the service flow.

Figure 16:
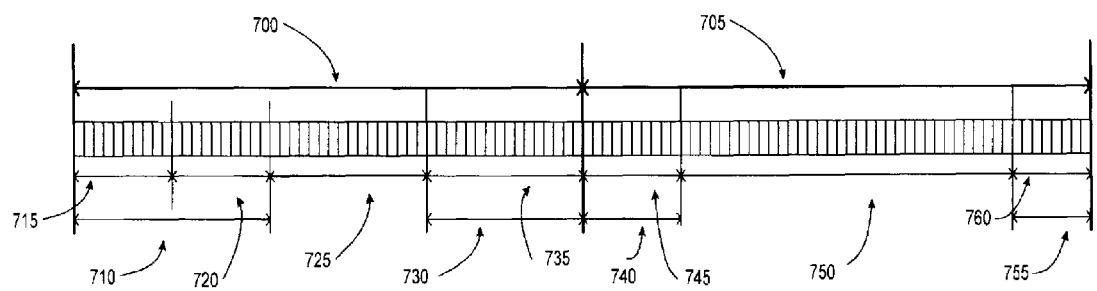
FIG. 16 graphically illustrates DSSB slot scheduling in a superframe structure.

Protocol operation and superframe structure of the DSSB protocol remains consistent between normal single channel, contention mode and guaranteed service mode. The addition of a guaranteed service mode appears as a dedicated slot time at the end of the superframe or beacon interval, as illustrated in FIG. 16 in which two beacon intervals 700 and 705, each including multiple slots, are depicted. The active slots 715, active extend slots 720, and inactive slots 725 all operate under normal conditions on a common channel or known hop sequence. This period acts as a control channel, is used for bandwidth requests and grants between neighbor nodes, and is used to pass packets in the "best effort" queue. The guaranteed time slots (GTS) 735 act as and on dedicated RF working channels for data transfer for a scheduled duration. Beacon interval 700 has a common control channel 710 including a number of active slots 715 and a number of active extend slots 720, a series of inactive slots 725 and slots that can be scheduled as guaranteed time slot 735. The guaranteed time slots 735 communicate on a dedicated working channel 730 that is different from the control channel and pre-negotiated between the communicating node pair. Beacon interval 705 illustrates the superframe by superframe dynamic nature of the slot architecture. It also has a common control channel 740 including a number of active slots 745, but no communications occurred between the nodes, thus the active extend period 720 shown in the first superframe 700 were not necessary in superframe 705. The nodes go to a low power sleep mode and series of inactive slots 750 occur. If guaranteed bandwidth opportunities have been pre-scheduled guaranteed time slot 760 communication occurs on arranged working channels 755.

Slot and channel scheduling is done via a bitmapped exchange of slot and channel maps in bandwidth reservation messaging. The messaging is analogous to sharing appointment calendars between neighbor nodes. The requesting node initiates the transaction with a request including its bitmap of slot and channel usage. The receiving node does a logical bit masking with the request map. The result is sent back in the response and the first available slots and channel are selected according to the number of slots requested.

To minimize end-to-end latency, the destination address of the packet or service flow is included in the bandwidth request. The destination address allows next hop nodes to reserve additional slots and thus multiple hop bandwidth reservations can occur in a single active interval.

To alleviate channel overlap and hidden nodes, each node must track channels claimed or used by neighbor nodes in its neighborhood. As part of the channel request and update process, each node attempts to "own" a channel in its neighborhood. The channel mask passed in the channel request message represents all 1-hop neighbors for each node and thus the bit masking process by the receiving node will also eliminate 2-hop neighbors from owning the same channel. Channel updates are performed periodically to refresh the channel list and also should be included in each initial slot request message to insure the channel map is up to date.

Bandwidth requests can be fixed, short duration or perpetual based on the service flow requirements. For short duration requests, subsequent slot allocations are performed through "piggyback" requests and grants. Piggyback messaging is included in an extended MAC header for subsequent slot requests. This characteristic allows slots to be continually allocated for the duration of the superframe in a "daisy-chained" manner such that whole sequences of message exchanges are possible without waiting for another active interval. This technique reduces message latency and also enables longer sleep intervals between beacon intervals.

Figure 17:
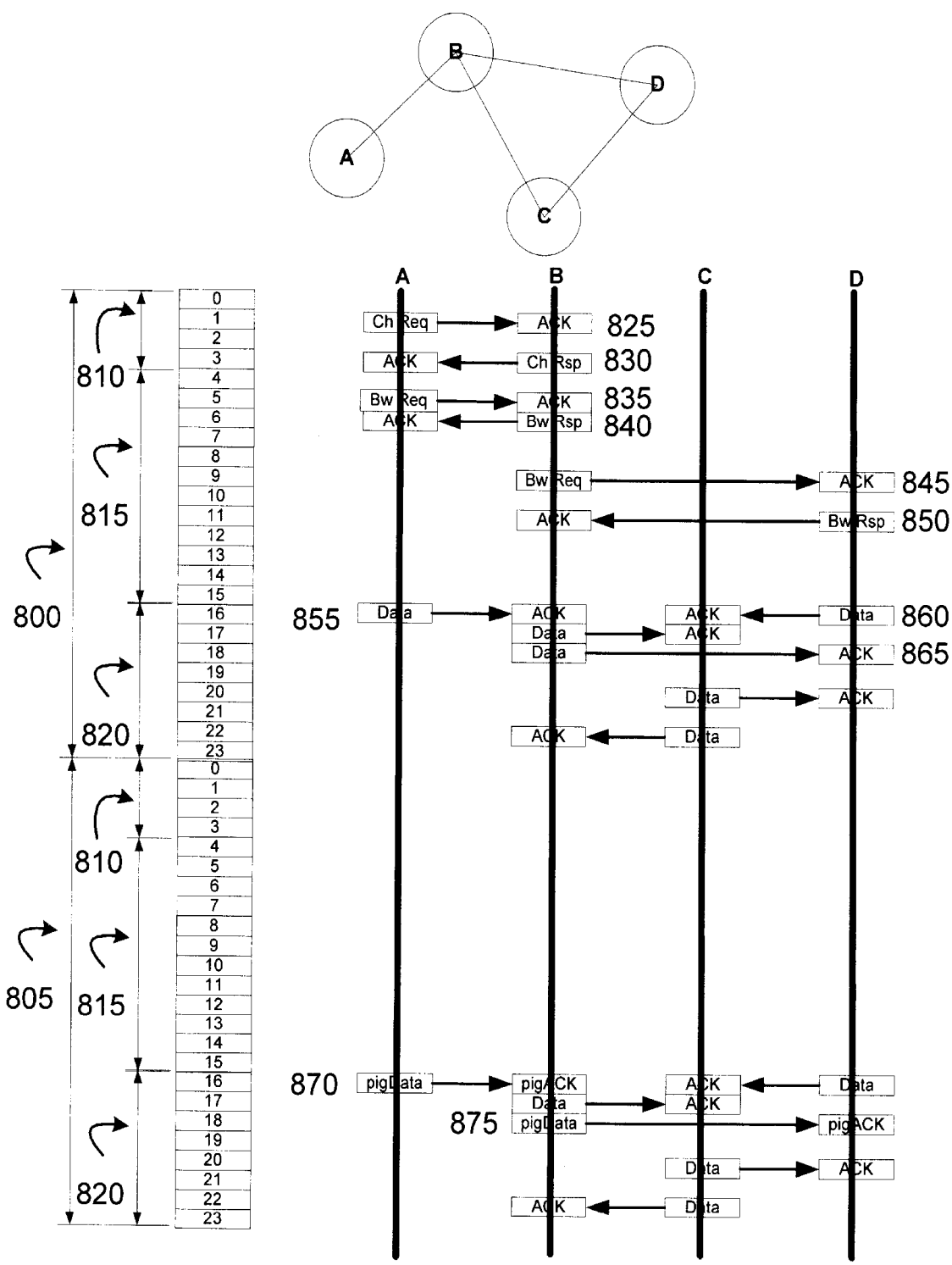
FIG. 17 exemplifies the message sequence for the scheduling process.

An example message sequence for the scheduling process is shown in FIG. 17. Two superframe intervals are represented at 800 and 805. Each of these superframe intervals is comprised in the example of 24 slots starting at slot 0. Interval 800 is comprised of active slots 810, extended slots 815 and guaranteed time slots (GTS) 820. Similarly, interval 805 is also comprised of active slots 810, extended slots 815 and GTS slots 820. In the scenario illustrated, Node A has data to send to Node D. Node A has not established a GTS channel code. The remaining nodes are assumed to already have established one which are channels 1, 6 and 3 for nodes B, C and D respectively. For illustration, assume node B and C have established indefinite GTS transfers in slots 1 and 6 to one another, while node C and node D have slot 0 and 4 assigned. Node A must first establish a channel code with B in the active contention interval. Channel 0 is the default for contention control channel. Node B has an established 8 bit (# of channels configurable) channel map of 11010010. Node A sends a Channel Request message to Node B at 825 with map field of 1000000 since the only control channel is known to Node A. Node B logical OR's the map and returns in the Channel Response at 830 message 11010010 to Node A in addition to 11000000 which indicates the channel Node B is claiming as its own. Node B knows Node A will select the first available channel (#2) for its channel and therefore updates its neighbor channel field to 11110010. Node A selects the first available channel (#2) from the bitmap field and updates its channel field to 11100000. Node A sends a Bandwidth Request to Node B at 835 with a slot map of 00000000 for the 8 GTS slots, destination address of Node D, duration of 2 intervals, and channel 2 confirmation. Node B has a slot bitmap of 01000010, OR's with 00000000, and returns 01000010 with channel 2 confirmation in the Bandwidth Response at 840. Node B updates its slot map to 11000010 and Node A updates its map to 100000000, both selecting slot 0 for communications. Since the active interval has been automatically extended by activity, Node B has a link to Node D and thus sends an additional Bandwidth Request to Node D at 845 and a previously established channel confirmation on Channel 1. Node D responds at 850 with a slot allocation on slot 2, channel 1, 2 beacon intervals. Node A sends a packet to Node B at 855 in GTS slot 0 (#16 overall) on channel 2. Nodes C and D simultaneously transfer prearranged data flows at 860 as an example. Since multiple hops were arranged in the contention active period, Node B forwards the packet received from Node A on to Node D at 865 in slot 2, channel 1. The GTS transfers continue in the next superframe interval on the previously arranged schedule. Thus, no further bandwidth or channel requests are necessary in the next active interval. Since no active interval 810 traffic occurred, the inactive slots 815 are automatically enabled for power consumption reduction. The data flow from Node A to Node D was scheduled for 2 intervals. This flow can be extended to additional intervals via the piggyback request mechanism 870 built into the extended MAC headers. This eliminates the need for additional contention based negotiations to continue the guaranteed slots. The receiving radio acknowledges the piggyback request via a piggyback acknowledgement (ACK) message 875.

Routing

DSSB uses a derivative of the standard AODV routing protocol. It discovers the best route for network packets on an on-demand basis by flooding Route Requests throughout the network and sending route replies back to the originator. When the network layer does not know how to route a packet, it broadcasts a route request (RREQ). Any intermediate nodes create a route back to the originator and broadcast a new RREQ on behalf of the originator. When the destination node (or a node that knows a route to the destination) hears the RREQ, it sends a route reply (RREP) back. This results in all nodes along the path learning the routes to both source and destination. The routes are kept until they timeout due to inactivity or a link fails. Link failure is detected at the MAC layer when a frame is sent the maximum number of times without receiving an acknowledgement. In this case, a route error (RERR) message is generated which propagates back to all uses of the route. If new packets arrive, the route discovery process is restarted at the originating node with a RREQ message. This implementation does not do route repair, so routing discovery is only initiated at the source node.

Figure 18:
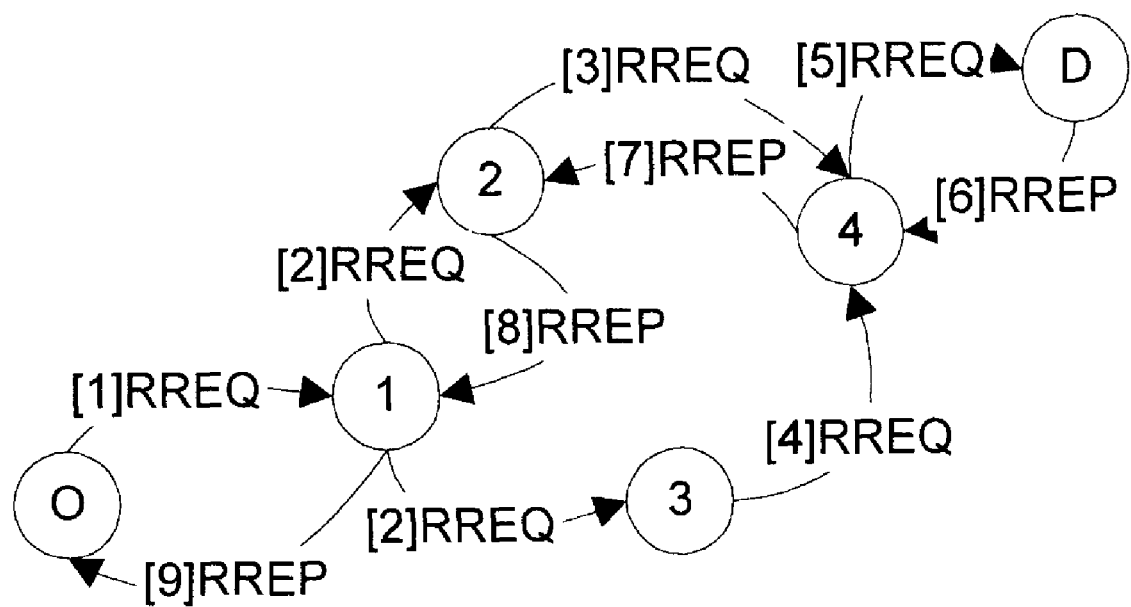
FIG. 18 illustrates a route discovery from an Originating node to a Destination note.

FIG. 18 shows a route discovery from the Originating node (O) to the Destination node (D). Node O wants to send a packet to node D. The packet is queued and an RREQ is broadcast. Node 1 broadcasts an RREQ, but Node O ignores the RREQ from node 1. Node 2 broadcasts its RREQ which is ignored by node 1 since it matches the sequence number of an RREQ it is already handling. Then, node 3 broadcasts an RREQ which is ignored by node 4 since it is already handling the RREQ from node 2. Finally node 4 broadcasts its RREQ. Node D then sends an RREP back to node 4 which sends an RREP back to node 2. Node 3 sends its RREP back to node 1 which then sends an RREP back to node O. Node O can now send the original packet destined for node O to node 1.

Table 1 shows the entries in the various nodes routing tables after the example routing discovery is completed.

TABLE 1

| Node | Destination | Next Hop | Hops | Notes |
|------|-------------|----------|------|-------|
| O | D | 1 | 4 | |
| O | 1 | 1 | 1 | |
| 1 | O | O | 1 | |
| 1 | D | 2 | 3 | |
| 2 | O | 1 | 2 | |
| 2 | D | 4 | 2 | |
| 3 | O | 1 | 2 | Will timeout if not used. |
| 4 | O | 2 | 3 | |
| 4 | D | D | 1 | |
| D | O | 4 | 4 | |

To ensure the best route, AODV assigns a cost to each hop based on signal strength, as shown in Table 2.

TABLE 2

| RSSI | Cost |
|------|------|
| −60 | 2 |
| −70 | 3 |
| −80 | 5 |
| −90 | 6 |

Since the success rate for a given signal strength can vary based on hardware, bit rate, and modulation types, the current implementation uses a 4 step configurable lookup table. The default cost is 1 per hop, this can be increased as the signal strength gets lower based on the cost table. The route with the lowest total cost is used. With this table in place, the algorithm will prefer to take 2 hops with signals stronger than −60 versus one link at −75.

End-To-End Link Reliability

Broadcast Buddy is one technique to improve the reliability of broadcast messages and is employed by DSSB. The standard DSSB contention algorithm may sometimes have issues with broadcast reliability. Broadcasts get lost when two nodes send in the same slot and have a collision. For unicast frames, when a collision happens there is no ACK, and the frames are retried. Since broadcast frames have no acknowledgment, they cannot be retried and are simply lost. Ideally a broadcast buddy should be neither be too close nor too far away. If the buddy is too close, RF capture may occur and a frame may be heard even in a collision that causes all other nodes to miss it. If the buddy is too far away, it may miss the message even when there is no collision wasting bandwidth. Currently the RSSI window is set to −15 through −85. If there are no neighbors in the valid range, a frame is sent as a normal broadcast.

There are limitations with this approach, however. While the use of a broadcast buddy does not guarantee that all nodes heard the frame, it does guarantee that at least one other node (the broadcast buddy) heard the frame. In the worst case of RF capture, at least the capturing node heard the frame. In the event that a neighbor is picked that is no longer there or cannot hear the transmission, retransmission occurs the normal maximum number of times thereby wasting some RF bandwidth. The use of the broadcast buddy system means that broadcast messages can be repeated in which case the retransmissions should be handled the same way as duplicate unicast frames.

Efficient File Transfer Over a Mesh Network

When transferring a large file over a mesh network, the file must first be broken down into very small packets. Each individual packet must be able to fit within one transmission (or slot) between two nodes. As such, many packets are needed to transmit the entire file and all must reach their destination for proper file composition. In a mesh network, multiple routes may exist from the source to the destination. These routes are dynamic and pose the following issues:

Packets may arrive out of order.

Some packets may not arrive at all.

If the nodes in the mesh employ a form of link-to-link acknowledgement, some packets may be received more than once due to transmission retries.

In a mesh, the retrying of packets adds to the congestion and further burdens each node.

Two additional complexities exist:

How does the sender know if the receiver has gone offline?

How does the receiver know if the sender has gone offline?

The following describes a solution to these problems while minimizing the mesh traffic.

It is assumed that the file transfer algorithm must know the following characteristics of the network:
  The maximum size that can be transmitted in a single packet
  The time needed for the typical worst case for a packet to make it through the network.

Figure 19:
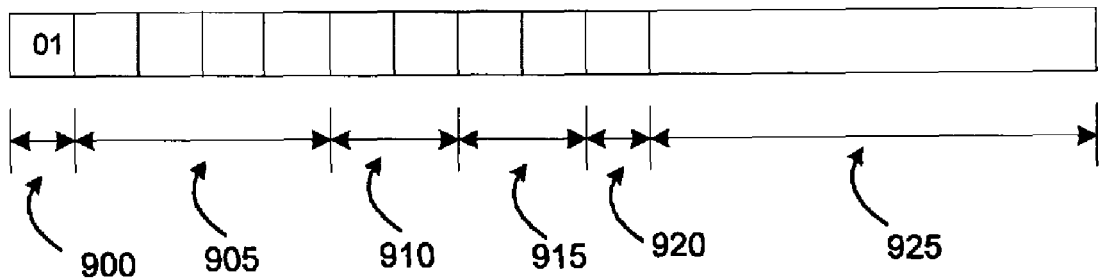
FIG. 19 shows the format of a start transfer message

Each message packet begins with a command byte followed by data particular to that command There are 6 commands:
  1. Start Transfer
  2. Stop Transfer
  3. Request Part
  4. Reply Part
  5. File Complete
  6. Error The Start Transfer Message is transmitted by the sender to initiate the file transfer and is illustrated in FIG. 19. The first byte is the command byte 900 (0x01) and is followed by the file size 905 (4 bytes). The number of parts 910 (2 bytes) denotes the number of pieces the file will be broken into and is determined by the part size 915 (the next 2 bytes). The part size 915 should be the maximum packet size allowed minus 3 to allow for header information. The Start Transfer Message then contains the length of the filename 920 (1 byte) followed by the actual filename characters 925. Note the limitation of the file size is determined by part size multiplied by 65535.

Figure 20:
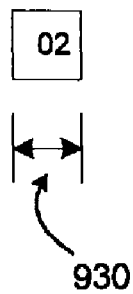
FIG. 20 shows the format of a stop transfer message.

The Stop Transfer Message can be sent by either the sender or receiver to manually stop the file transfer process and is illustrated in FIG. 20. The command byte 930 is 0x02 and there is no payload for a Stop Transfer Message.

Figure 21:
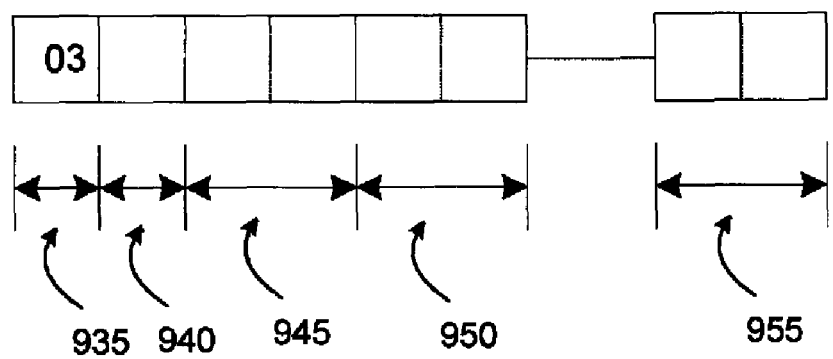
FIG. 21 shows the format of a request part message.

The Request Part Message is transmitted by the receiver and tells the sender it would like more part(s) of the file and is illustrated in FIG. 21. The number of parts requested 940 (1 byte) follows the command byte 935 (0x03). The payload that follows is two-byte part numbers 945, 950 and 955 representing the pieces the receiver needs.

Figure 22:
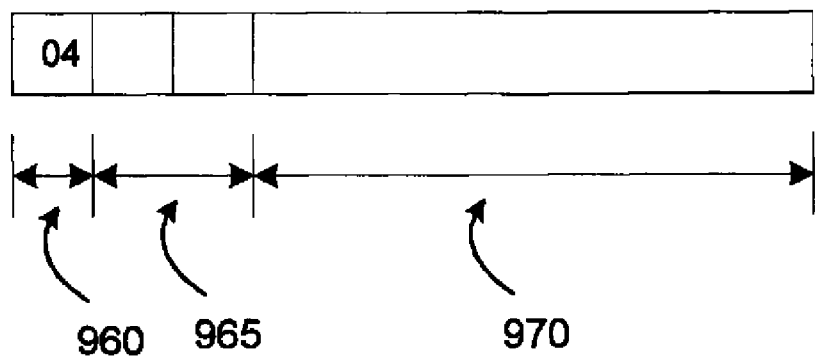
FIG. 22 shows the format of a reply part message.

The Reply Part Message is sent by the sender in response to a Request Part Message and is illustrated in FIG. 22. The command byte 960 (0x04) is followed by the part number 965 (2 bytes) that was requested. The payload 970 contains the bytes of the file part and its size was sent in the Start Transfer Message. For the last part of a file, the receiver can handle a part length that may be less than the part size.

Figure 23:
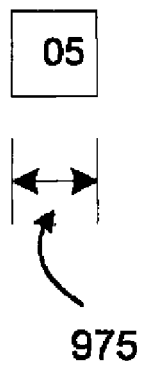
FIG. 23 shows the format of a file complete message.

The File Complete Message is transmitted by the receiver and informs the sender that the file transfer process was completed successfully. It is illustrated in FIG. 23. There is no payload following the command byte 975 (0x05).

Figure 24:
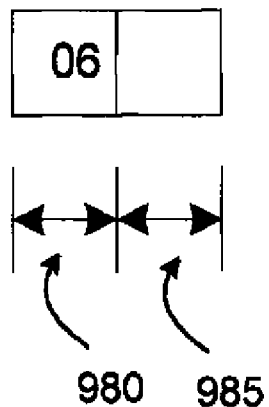
FIG. 24 shows the format of an error message.

The Error Message can be sent by either the sender or receiver at any time. It is illustrated in FIG. 24 and includes a command byte 980 and error code byte 985. The error code byte can be one of the following:
  User Stop (0x01)—Sent when the file transfer process is aborted manually by the user.
  Bad Part Size (0x02)—Sent when part size exceeds the maximum part size allowed by the receiver
  Access Error (0x03)—Sent when there is a problem accessing or writing to the file.

In addition, to detect transmission problems in the network, the sender and receiver employ timers that will signal timeouts. Retry counters are also used to keep track of the number of issues and when a maximum number is reached, the transfer process will abort.

An example of the process for transferring files is illustrated in block diagram and pseudocode form in FIG. 25A, FIG. 25B, FIG. 25C, FIG. 25D, FIG. 25E, and FIG. 25F. The sender initiates the file transfer process in FIG. 25A at 1000 by opening the file at 1005, calculating the number of pieces it will be broken into at 1010, creating a Start Transfer Message at 1015 and transmitting that Start Transfer Message to the receiver at 1020. The sender then starts a session retry timer at 1095 and transitions into a wait state at 1100 for either network message event at 1300 or timer expiration event at 1505, as explained below.

Figure 25B:
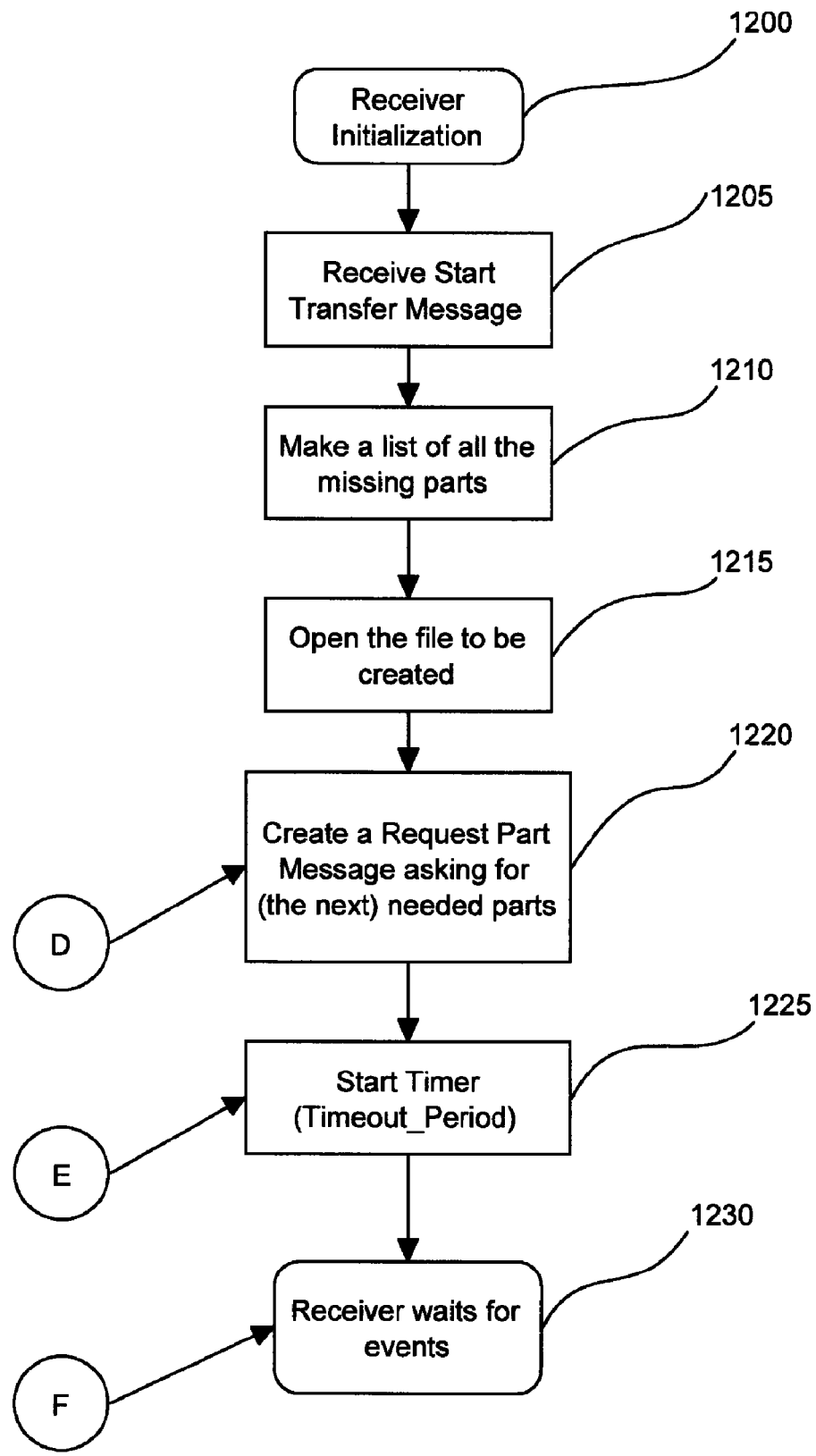

The receiver initialization is illustrated in FIG. 25B. The receiver goes through a state initialization process at 1200 and parses the Start Transfer Message received over the network at 1205. It establishes a list of data parts to receive at 1210 and opens a repository file at 1215. The receiver creates a Request Part Message requesting the initial X (configurable) parts of the message at 1220 and sends the request over the network. The receiver then starts an event timer at 1225 and transitions to an event wait state at 1230.

Figure 25C:
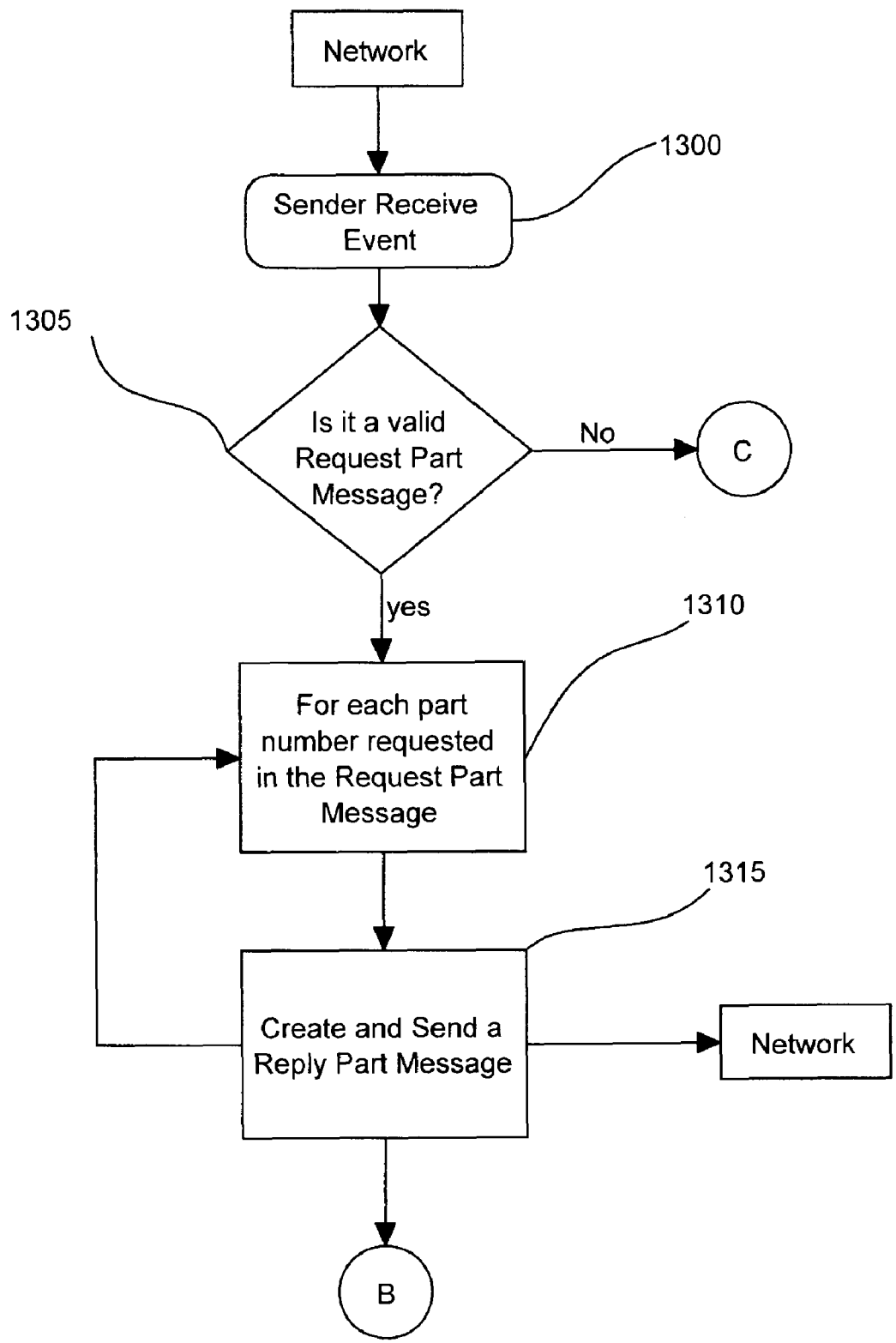

In FIG. 25C, at 1300 the sender receives a network event from the receiver and then determines whether a valid request part message has been received at 1305. If the message is not valid, the sender discards the message and enters the wait state at 1100. If valid, the sender receives the X (configurable) parts at 1310 and for each Request Part Message parsed sends a Reply Part Message at 1315 back to the receiver. This process loops until all messages are sent to the network and then the sender enters the wait for event state at 1100.

Figure 25D:
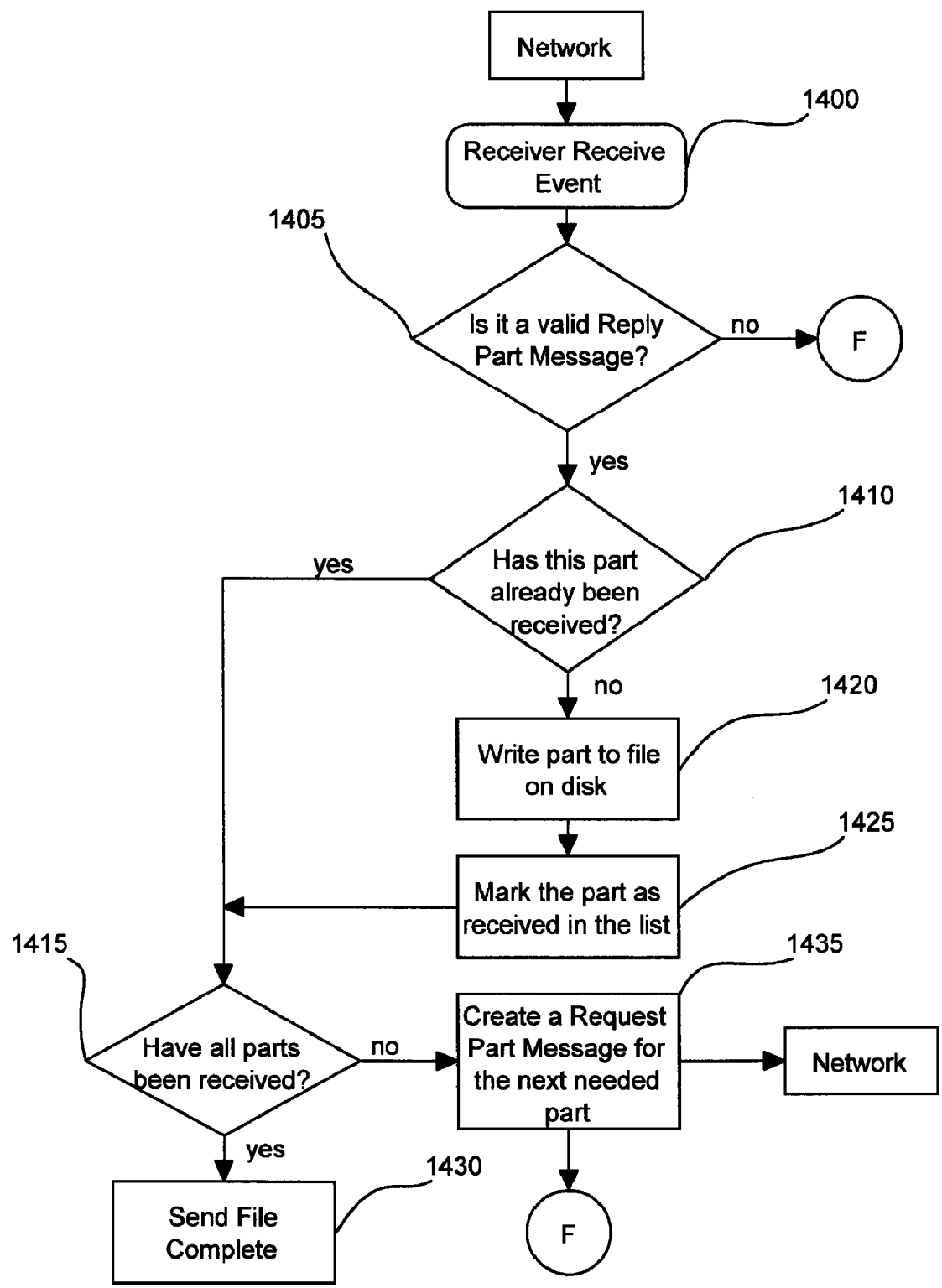

In FIG. 25D at 1400 the receiver processes a network event. It tests the Reply Part Message for valid format at 1405 and if not valid, the receiver returns to the event wait state at 1230. If the message is valid, the receiver checks to see if the part has already been received at 1410. If yes, the algorithm continues at 1415 and, if no, the processing continues at 1420. At 1420 the file part is written to memory and then the part is marked as complete on the received list at 1425. At 1415 the processing continues by reviewing the list to determine if all parts have been received. If all parts are received, the receiver sends a File Complete message at 1430 to end the session with the sender. If more parts remain, the receiver sends an additional Request Part Message to the network for the next needed parts at 1435 and returns to the event wait state at 1230.

Figure 25E:
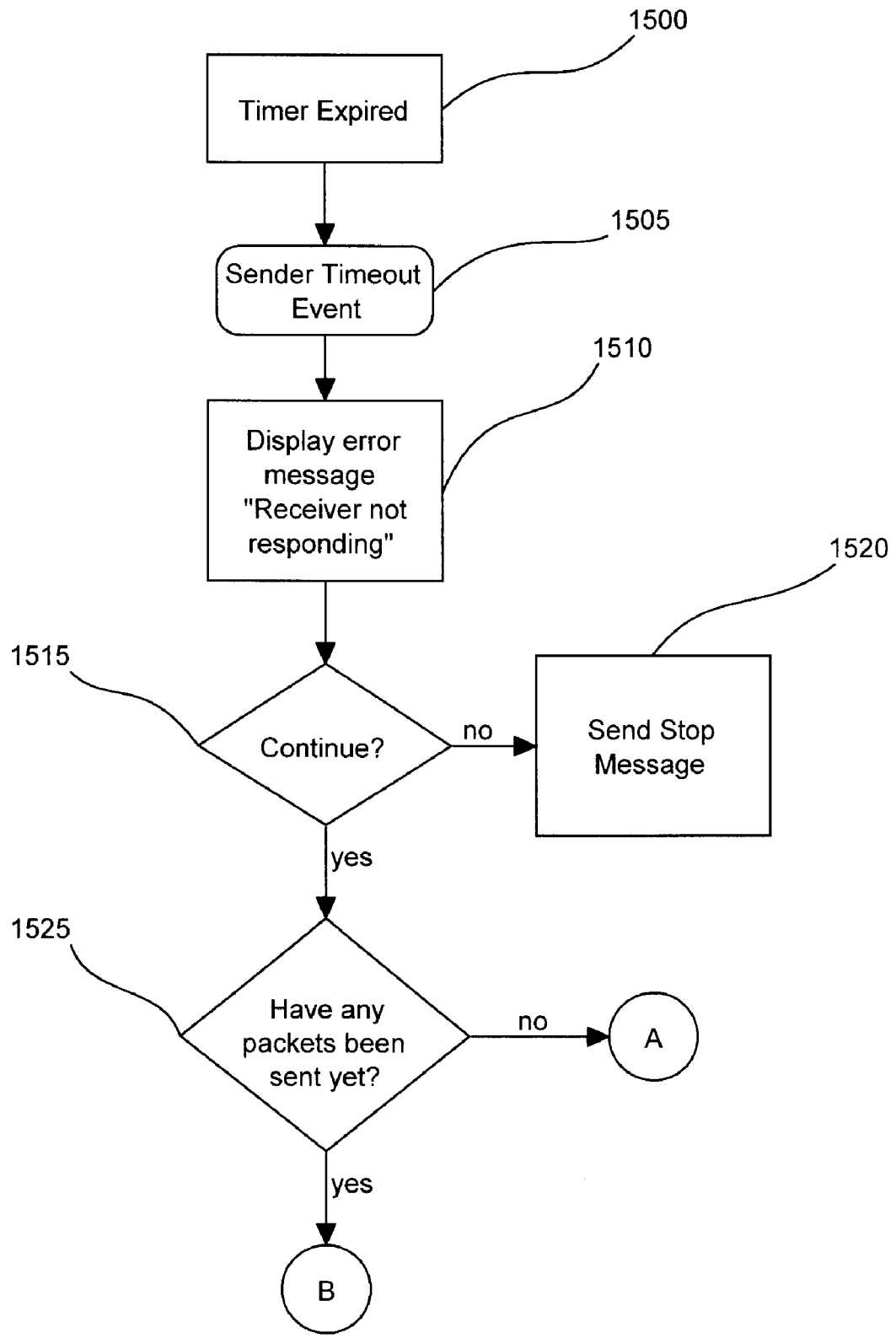

The sender has a timer algorithm, illustrated in FIG. 25E, that detects when the receiver has gone quiet. The timer is reset to 5 seconds (tunable) multiplied by 5 retries (tunable) for a total of 25 seconds. When the timer expires at 1500, a timer event occurs at 1505 and the sender displays an error message of "Receiver not responding" at 1510. An upper layer control mechanism (human, application algorithm) makes a decision whether or not to continue at 1515. If not, a Stop Message is sent at 1520. If the decision is to continue and no packets have been sent as determined at 1525, the process returns to 1020 to start the transfer over. If packets have been sent, the sender's timer is started at 1095 until transmission is complete whereupon the sender waits for further events at 1100.

Figure 25F:
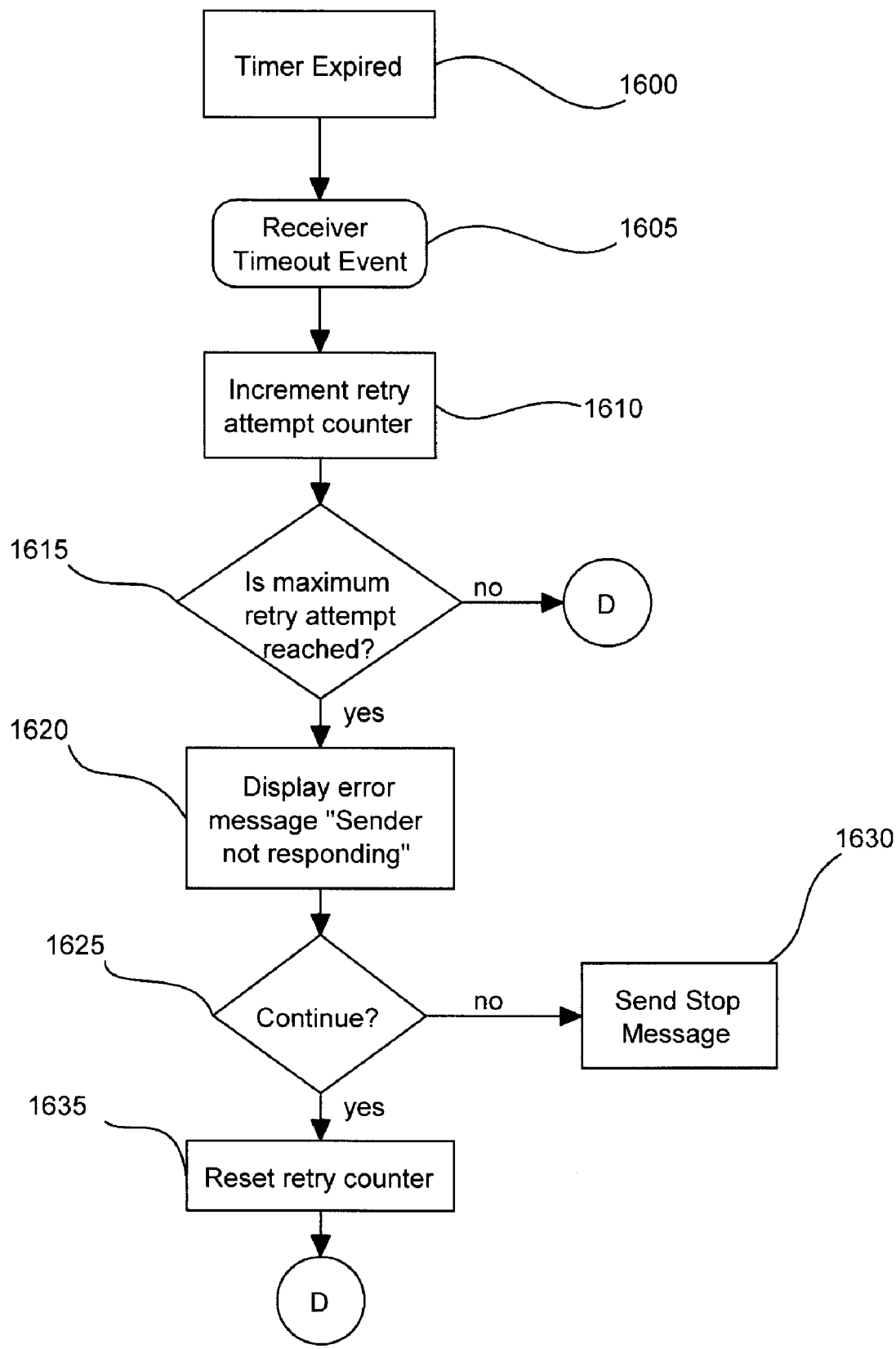

The receiver maintains its own timeout event handling process, as illustrated in FIG. 25F. When the timer expires at 1600, a receiver timeout event is generated at 1605. If this timer runs out, the receiver will then request 5 more parts of the file. The timer is allowed to run out 5 times (tunable) in a row before the file transfer process is aborted. Typically, there would be 5 packets "in flight" but as packets get lost (either requests or replies), this number decreases to 0 at which point the timer is necessary to continue part requests. Upon timer expiration, a retry counter is incremented at 1610 and the maximum retry count is checked at 1615. If the retry count is not exceeded, the receiver requests more parts at 1220. If the count exceeds the maximum, an error message is generated at 1620 and a decision whether or not to continue is made at 1625. An upper layer control mechanism (human, application algorithm) makes the decision whether or not to continue. If not, a Stop Message is sent to the sender at 1630 and the algorithm ends. If the decision is to continue, the retry counter is reset at 1635 and the receiver requests more parts at 1220.

While the preferred embodiments of the present invention have been illustrated and described, it will be understood by those skilled in the art that various changes and modifications may be made, and equivalents may be substituted for elements thereof without departing from the true scope of the present invention. Many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A method for autonomous wireless sensor nodes in an ad hoc, distributed scaleable wireless sensor node network with nodes having neighbor nodes, some of which may be gateway nodes, orphan nodes and clusters of nodes, to synchronize timing with each other within time slots under the control of an autonomously determined network Time Master node using synchronization packets identifying for each such packet the sending node's cluster Time Master node ID number, sending node Time Rank, sending node Time Sequence Number, sending node source identification, packet transmission time, slot alignment offset, slot number, operating channel number and time synchronization data wherein each node in the network is identified by a node ID number and each node in a cluster has associated therewith a cluster Time Master node ID number, a cluster node Time Rank and a cluster node Time Sequence Number and wherein further for each cluster in the network a node ID number of a Time Master, a Time Rank, a Time Sequence, a timestamp and a node ID number of a Time Parent is stored in memory, comprising:

initially designating all nodes as Time Master nodes;
   placing all nodes in a wait state to listen for synchronization packets;
   transmitting synchronization packets from one sending node to its neighbor nodes, wherein for each received synchronization packet at a neighbor node:
   parsing data in each synchronization packet received;
   determining based on the parsed data in each synchronization packet received whether the receiver's configured operating channel matches that of the sender;
   if not, processing the remainder of the received synchronization packet;
   otherwise, determining second whether the receiving node is configured to synchronize to a known network gateway Time Master node;
   if so, and the Time Master node ID number associated with the sending node is not the same as the known preconfigured network gateway Time Master node ID number, processing the remainder of the received synchronization packet;
   otherwise, determining third if the receiving node is an orphan node;
   if so, synchronizing the sending and the receiving node and returning to the placing;
   otherwise, determining fourth if the cluster Time Master node ID number contained in the synchronization packet associated with the sending node is the same as the receiving node ID number;
   if so, processing the remainder of the received synchronization packet;
   otherwise, determining fifth if the Time Master node ID number contained in the synchronization packet associated with the sending node is equal to the known cluster Time Master node ID number associated with the receiving node;
   if so, determining sixth if a sending node Time Sequence Number differs from the cluster Time Sequence Number associated with the receiving node;
   if so, synchronizing the receiving node;
   if not, determining seventh if a synchronization packet sending node ID number is the same as the node ID number of the Time Parent;
   if so, processing the remainder of the received synchronization packet;
   if not, determining eighth whether the sending node's Time Rank is greater than the cluster node's Time Rank plus one;
   if so, synchronizing the sending and the receiving node and returning to the placing;
   otherwise, processing the remainder of the received synchronization packet;
   otherwise, if the Time Master node ID number contained in the synchronization packet associated with the sending node is not equal to the known cluster Time Master node ID number,
   determining ninth if the sending node's Time Master node ID number is less than a current cluster Time Master node ID number;
   if so, synchronizing the receiving node with the sending node's Time Master node;
   otherwise, processing the remainder of the received synchronization packet.

2. The method of claim 1 wherein a dedicated network gateway is part of the distributed network and the gateway node having the highest seniority metric is designated as Time Master of the network.

3. The method of claim 1 wherein transmitting occurs either during designated periodic pilot beacon time slots or following receipt of a data packet in a time slot.

4. The method of claim 1 wherein synchronizing further comprises:
   determining first whether the receiving node is an orphan;
   if not, transmitting a cluster departure packet prior to adjusting synchronization to a new cluster;
   otherwise, adjusting a time slot offset and a channel hopping pattern to match that of the sending node;
   determining second whether the receiving node ID number is the same as the receiving node's preconfigured gateway ID number;
   if so, designating the receiving node as a gateway node, assigning the time master ID number to that receiving node, updating media access control command frame Time Master data and processing the remainder of the received synchronization packet;
   otherwise, determining third whether the Time Master node ID number of the sending node is the same as the receiving node's preconfigured gateway ID number;
   if so, designating the sending node as a gateway node and updating the time metrics of the receiving node;

otherwise, determining fourth whether the receiving node ID number is less than the sending node ID number;

if so, designating the receiving node as the Time Master;

otherwise, designating the sending node as the Time Master; and returning to the placing.

* * * * *